US011770329B2

(12) United States Patent
Chunduri et al.

(10) Patent No.: US 11,770,329 B2
(45) Date of Patent: Sep. 26, 2023

(54) ADVERTISING AND PROGRAMMING PREFERRED PATH ROUTES USING INTERIOR GATEWAY PROTOCOLS

(71) Applicant: HUAWEI TECHNOLOGIES CO., LTD, Shenzhen (CN)

(72) Inventors: Uma S. Chunduri, Fremont, CA (US); Alexander Clemm, Los Gatos, CA (US); Yingzhen Qu, San Jose, CA (US); Renwei Li, Fremont, CA (US); Kiran Makhijani, Los Gatos, CA (US); Lin Han, San Jose, CA (US)

(73) Assignee: Huawei Technologies Co., Ltd., Shenzhen (CN)

( * ) Notice: Subject to any disclaimer, the term of this patent is extended or adjusted under 35 U.S.C. 154(b) by 51 days.

(21) Appl. No.: 16/997,427

(22) Filed: Aug. 19, 2020

(65) Prior Publication Data
US 2020/0382415 A1     Dec. 3, 2020

Related U.S. Application Data

(63) Continuation of application No. PCT/US2019/015419, filed on Jan. 28, 2019.
(Continued)

(51) Int. Cl.
*H04L 45/00* (2022.01)
*H04L 45/122* (2022.01)
(Continued)

(52) U.S. Cl.
CPC ............ *H04L 45/34* (2013.01); *H04L 45/122* (2013.01); *H04L 45/50* (2013.01); *H04L 45/741* (2013.01); *H04L 45/745* (2013.01)

(58) Field of Classification Search
CPC ....... H04L 45/34; H04L 45/122; H04L 45/50; H04L 45/741; H04L 45/745
See application file for complete search history.

(56) References Cited

U.S. PATENT DOCUMENTS

| 5,502,816 A | 3/1996 | Gawlick et al. |
| 7,751,405 B1 | 7/2010 | Kompella |
| | (Continued) | |

FOREIGN PATENT DOCUMENTS

| CN | 101036134 A | 9/2007 |
| CN | 101401083 A | 4/2009 |
| | (Continued) | |

OTHER PUBLICATIONS

Previdi, S., Ed., et al., "IS-IS Extensions for Segment Routing," draft-ietf-isis-segment-routing-extensions-15, Dec. 19, 2017, 34 pages.
(Continued)

*Primary Examiner* — Jung H Park
(74) *Attorney, Agent, or Firm* — Conley Rose, P.C.

(57) ABSTRACT

A method implemented by a network element (NE) in a network, comprising receiving, by the NE, an advertisement comprising preferred path route (PPR) information representing a PPR from a source to a destination in the network, the PPR information comprising a PPR identifier (PPR-ID) and a plurality of PPR description elements (PPR-PDEs) each representing an element on the PPR, receiving, by the NE, a data packet comprising the PPR-ID, and forwarding, by the NE, the data packet having the PPR-ID to a next element on the PPR based on the plurality of PPR-PDEs.

21 Claims, 17 Drawing Sheets

Related U.S. Application Data

(60) Provisional application No. 62/634,425, filed on Feb. 23, 2018.

(51) Int. Cl.
*H04L 45/50* (2022.01)
*H04L 45/741* (2022.01)
*H04L 45/745* (2022.01)

(56) References Cited

U.S. PATENT DOCUMENTS

| | | | |
|---|---|---|---|
| 8,830,826 | B2 | 9/2014 | Chen |
| 8,995,303 | B1 | 3/2015 | Brar et al. |
| 9,369,371 | B2 | 6/2016 | Filsfils et al. |
| 9,450,817 | B1 | 9/2016 | Bahadur et al. |
| 9,660,897 | B1 | 5/2017 | Gredler |
| 9,838,246 | B1 | 12/2017 | Hegde et al. |
| 10,003,519 | B2 | 1/2018 | Lee |
| 10,122,614 | B2 | 11/2018 | Eckert et al. |
| 10,142,220 | B2 | 11/2018 | Santos et al. |
| 10,178,029 | B2 | 1/2019 | Levy et al. |
| 10,460,066 | B1 | 10/2019 | Posser et al. |
| 10,547,538 | B2 | 1/2020 | Chen et al. |
| 11,032,197 | B2 | 6/2021 | Nainar et al. |
| 2003/0005149 | A1 | 1/2003 | Haas et al. |
| 2003/0014540 | A1 | 1/2003 | Sultan et al. |
| 2004/0208119 | A1 | 10/2004 | Christodoulou et al. |
| 2006/0117110 | A1 | 6/2006 | Vasseur et al. |
| 2007/0214275 | A1 | 9/2007 | Mirtorabi et al. |
| 2008/0075016 | A1 | 3/2008 | Ashwood-Smith |
| 2009/0185494 | A1 | 7/2009 | Li et al. |
| 2010/0220736 | A1 | 9/2010 | Mohapatra et al. |
| 2011/0032945 | A1 | 2/2011 | Mullooly et al. |
| 2011/0069713 | A1 | 3/2011 | Mariblanca Nieves |
| 2012/0158639 | A1 | 6/2012 | Moore et al. |
| 2012/0224506 | A1 | 9/2012 | Gredler et al. |
| 2012/0243539 | A1 | 9/2012 | Keesara |
| 2013/0070745 | A1 | 3/2013 | Nixon et al. |
| 2013/0103739 | A1 | 4/2013 | Salgueiro et al. |
| 2013/0163467 | A1 | 6/2013 | Tesov |
| 2013/0286846 | A1 | 10/2013 | Atlas et al. |
| 2014/0379910 | A1 | 12/2014 | Saxena et al. |
| 2015/0055654 | A1 | 2/2015 | Song |
| 2015/0078205 | A1 | 3/2015 | Stoger |
| 2015/0229618 | A1 | 8/2015 | Wan et al. |
| 2015/0244607 | A1 | 8/2015 | Han |
| 2015/0244628 | A1 | 8/2015 | Gredler et al. |
| 2016/0099864 | A1 | 4/2016 | Akiya et al. |
| 2016/0189035 | A1 | 6/2016 | Shakeri et al. |
| 2016/0192029 | A1 | 6/2016 | Bergstrom |
| 2016/0308758 | A1 | 10/2016 | Li et al. |
| 2017/0012895 | A1 | 1/2017 | Zhao et al. |
| 2017/0061138 | A1* | 3/2017 | Lambert ............ H04L 63/0428 |
| 2017/0104668 | A1 | 4/2017 | Zhang et al. |
| 2017/0187629 | A1 | 6/2017 | Shalev et al. |
| 2017/0230276 | A1 | 8/2017 | Ceccarelli et al. |
| 2017/0237656 | A1 | 8/2017 | Gage |
| 2017/0289027 | A1 | 10/2017 | Ratnasingham |
| 2017/0346718 | A1* | 11/2017 | Psenak .................... H04L 45/02 |
| 2018/0004751 | A1 | 1/2018 | Vikhe et al. |
| 2018/0102965 | A1 | 4/2018 | Hari et al. |
| 2018/0254974 | A1 | 9/2018 | Seo |
| 2018/0351864 | A1 | 12/2018 | Jeganathan et al. |
| 2019/0058657 | A1* | 2/2019 | Chunduri ................ H04L 45/12 |
| 2019/0182155 | A1 | 6/2019 | Chang |
| 2019/0278284 | A1 | 9/2019 | Zhang et al. |
| 2019/0394115 | A1 | 12/2019 | Li |
| 2020/0021515 | A1 | 1/2020 | Michael et al. |
| 2020/0136960 | A1 | 4/2020 | Jeuk et al. |
| 2020/0296025 | A1 | 9/2020 | Wang |
| 2021/0176168 | A1 | 6/2021 | Eckert et al. |

FOREIGN PATENT DOCUMENTS

| | | |
|---|---|---|
| CN | 105337785 A | 2/2016 |
| CN | 106063203 A | 10/2016 |
| CN | 106301952 A | 1/2017 |
| CN | 107579838 A | 1/2018 |
| CN | 107637031 A | 1/2018 |
| WO | 2015167479 A | 11/2015 |
| WO | 2017141078 A1 | 8/2017 |
| WO | 2019210769 A1 | 11/2019 |

OTHER PUBLICATIONS

Dhody, D., Ed., et al., "A Yang Data Model for Path Computation Element Communications Protocol (PCEP)," draft-ietf-pce-pcep-yang-06, Jan. 5, 2018, 108 pages.
Tantsura, J., et al., "Signaling MSD (Maximum SID Depth) Using IS-IS," draft-ietf-isis-segment-routing-msd-09, Jan. 10, 2018, 9 pages.
Xu, X., et al., "Signaling Entropy Label Capability and Readable Label-stack Depth Using IS-IS," draft-ietf-isis-mpls-elc-03, Jan. 3, 2018, 6 pages.
Filsfils, C., Ed., et al., "Segment Routing Architecture," draft-ietf-spring-segment-routing-14, Dec. 20, 2017, 31 pages.
Litkowski, S., et al., "YANG Data Model for Segment Routing," draft-ietf-spring-sr-yang-08, Dec. 28, 2017, 29 pages.
Hegde, S., "Traffic Accounting for MPLS Segment Routing Paths," draft-hegde-spring-traffic-accounting-for-sr-paths-01, Oct. 30, 2017, 14 pages.
Chunduri, U., et al., "Preferred Path Routing (PPR) in IS-IS," draft-chunduri-lsr-isis-preferred-path-routing-01, Jul. 2, 2018, 51 pages.
Qu, Y., et al., "YANG Data Model for Preferred Path Routing," draft-qct-lsr-ppr-yang-00, Jun. 27, 2018, 56 pages.
Previdi, S., Ed., et al., "IPv6 Segment Routing Header (SRH)," draft-ietf-6man-segment-routing-header-08, Jan. 20, 2018, 35 pages.
Awduche, D., et al., "RSVP-TE: Extensions to RSVP for LSP Tunnels," RFC 3209, Dec. 2001, 57 pages.
Kompella, K., et al., "The Use of Entropy Labels in MPLS Forwarding," RFC 6790, Nov. 2012, 25 pages.
Psenak, P., et al., "OSPFv2 Prefix/Link Attribute Advertisement," RFC 7684, Nov. 2015, 15 pages.
Crabbe, E., et al., "Path Computation Element Communication Protocol (PCEP) Extensions for PCE-Initiated LSP Setup in a Stateful PCE Model," RFC 8281, Dec. 2017, 20 pages.
Quinn, P., Ed., et al., "Network Service Header (NSH)," RFC 8300, Jan. 2018, 40 pages.
Filsfils, C., Ed., et al., "Segment Routing Architecture," RFC 8402, Jul. 2018, 32 pages.
Chunduri, "Usage of Non Shortest Path Forwarding (NSPF) IDs in OSPF," draft-ct-ospf-nspfid-for-sr-paths-00, Mar. 24, 2018, 14 pages.
Bates, et al., "Multiprotocol Extensions for BGP-4," RFC 4760, Jan. 2007, 12 pages.
Psenak, et al., "Multi-Topology (MT) Routing in OSPF," RFC 4915, Jun. 2007, 20 pages.
Przygiena, et al., "M-ISIS: Multi Topology (MT) Routing in Intermediate System to Intermediate Systems (IS-Iss)," RFC 5120 Feb. 2008, 14 pages.
Gredler, Ed., et al., "North-Bound Distribution of Link-State and Traffic Engineering (TE) Information Using BGP," RFC 7752, Mar. 2016, 48 pages.
Chunduri, U., "BGP Link-State extensions for NSPF ID," draft-chunduri-idr-bgp-ls-nspfid-00, Apr. 2, 2018, 7 pages.
Chunduri, U., Ed., et al., "Usage of Non Shortest Path Forwarding (NSPF) IDs in IS-IS," draft-ct-isis-nspfid-for-sr-paths-01, Mar. 23, 2018, 16 pages.
Han, L., et al., "Ipv6 in-band signaling for the support of transport with QoS," draft-han-6man-in-band-signaling-for-transport-qos-00, Oct. 11, 2017, 40 pages.
Previdi, S., et al., "Ipv6 Segment Routing Header (SRH)," draft-ietf-6man-segment-routing-header-11, Mar. 28, 2018, 34 pages.
Filsfils, C., Ed., et al., "Segment Routing Architecture," draft-ietf-spring-segment-routing-15, Jan. 25, 2018, 31 pages.

(56) References Cited

OTHER PUBLICATIONS

Chunduri, Uma S.; U.S. Appl. No. 62/649,355; Title: "Method and Apparatus for NonShortest Path Forwarding Identifiers (NSPF ID) Distribution and Maintenance", filed Feb. 28, 2018.
Adams, C., et al., "The Simple Public-Key GSS-API Mechanism (SPKM)," RFC 2025, 45 pages.
Braden, R., Ed., et al., "Resource Reservation Protocol (RSVP)," RFC 2205, Sep. 1997, 112 pages.
Li, T., et al., "IS-IS Extensions for Traffic Engineering," RFC 5305, Oct. 2008, 7 pages.
Previdi, S., Ed., et al., "IS-IS Traffic Engineering (TE) Metric Extensions," RFC 7810, May 2016, 18 pages.
Atlas, A., Ed., et al., "Basic Specification for IP Fast Reroute: Loop-Free Alternates," RFC 5286, Sep. 2008, 31 pages.
Bryant, S., et al., "Remote Loop-Free Alternate (LFA) Fast Reroute (FRR)," RFC 7490, Apr. 2015, 29 pages.
Bashandy, A., et al., "Loop avoidance using Segment Routing, draft-bashandy-rtgwg-segment-routing-uloop-03," Apr. 2, 2018, 7 pages.
Bashandy, A., et al., "Topology Independent Fast Reroute using Segment Routing, draft-bashandy-rtgwg-segment-routing-ti-lfa-05," Oct. 4, 2018, 19 pages.
Sivabalan, S., et al., "PCEP Extensions for Segment Routing," draft-ietf-pce-segment-routing-11, Nov. 20, 2017, 22 pages.
Bashandy, A., et al., "Topology Independent Fast Reroute using Segment Routing," draft-bashandy-rtgwg-segment-routing-ti-lfa-04, Mar. 30, 2018, 18 pages.
Mirsky, G., et al., "Bidirectional Forwarding Detection (BFD) in Segment Routing Networks Using MPLS Dataplane," draft-mirsky-spring-bfd-05, Mar. 1, 2018, 11 pages.
Atlas, A., et al., "An Architecture for IP/LDP Fast Reroute," RFC 7812, Jun. 2016, 44 pages.
Jumar, N., Ed., et al., "Label Switched Path (LSP) Ping/Traceroute for Segment Routing (SR) IGP-Prefix and IGP-Adjacency Segment Identifiers (SIDs) with MPLS Data Planes," RFC 8287, Dec. 2017, 25 pages.
Alimi, Ed., et al., "Application-Layer Traffic Optimization (ALTO) Protocol," RFC 7285, Sep. 2014, 91 pages.
U.S. Appl. No. 62/663,115; Title: "Resource Reservations and Maintenance for Preferred Paths in the Network Through Routing Protocols,", filed Apr. 26, 2019.
Filsfils, C., et al., "SRv6 Network Programming," Internet Draft, draft-filsfils-spring-srv6-network-programming-07, Feb. 14, 2019, 42 pages.
Chunduri, "Usage of Non Shortest Path Forwarding (NSPF) IDs in IGPs," draft-ct-isis-nspfid-for-sr-paths-00, IETF 101, London, Mar. 17-23, 2018, 10 pages.

\* cited by examiner

400

| Type 403 | Length 406 | Flags 409 | Prefix Length 412 | MT-ID 415 |
|---|---|---|---|---|

| Prefix 418 | PPR-ID 421 | PPR Type 424 | PPR-PDEs 427 | | | Attributes 430 | Non-Path Sub-TLVs 433 |
|---|---|---|---|---|---|---|---|
| | | | PPR PDE 427A | ... | PPR PDE 427N | | |

303

| PPR-ID 333 | PPR-Type 443 | PPR-PDE 366A | ... | PPR-PDE 366N |
|---|---|---|---|---|

450

| PPR-ID 333 | Source Address 446 | Prefix/ Destination Address 445 | Payload 449 |
|---|---|---|---|

IS-IS PPR TLV Format

IS-IS PPR TLV Flags Format

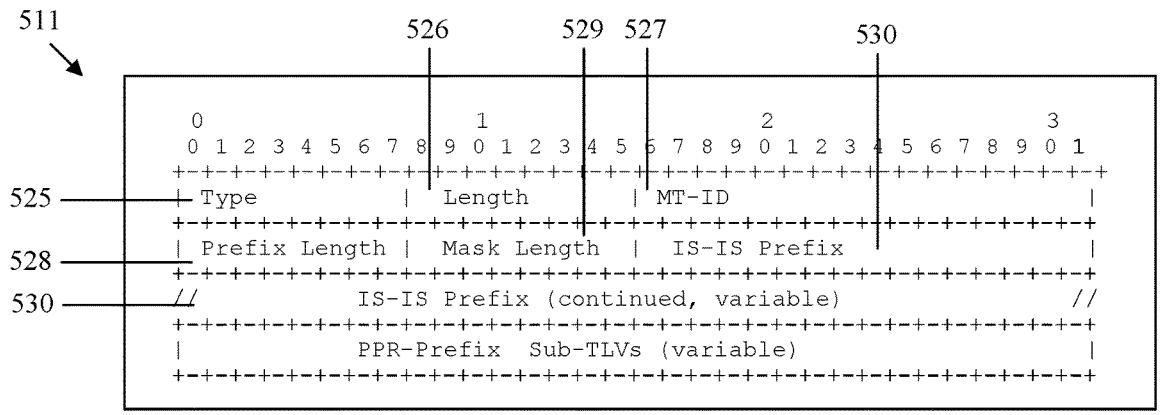
IS-IS PPR-Prefix Sub-TLV Format   FIG. 5C
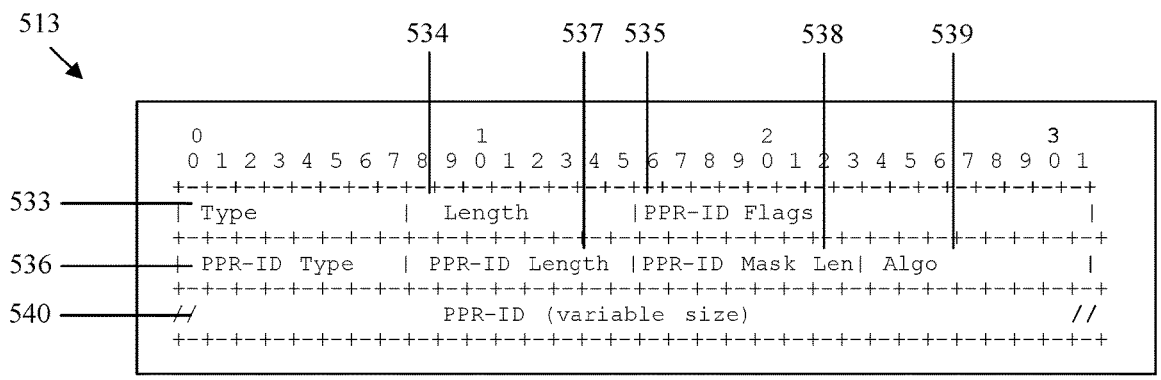
IS-IS PPR-ID Sub-TLV Format   FIG. 5D
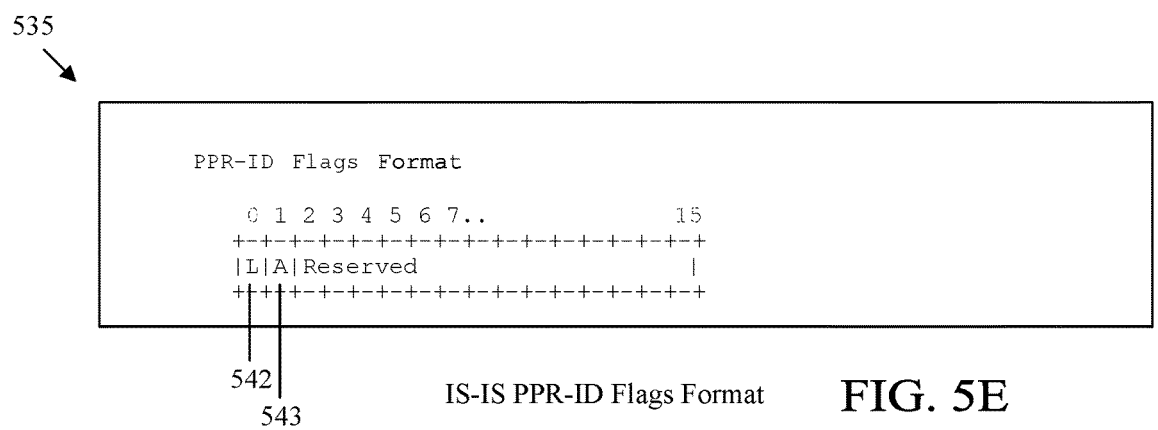
IS-IS PPR-ID Flags Format   FIG. 5E IS-IS PPR-PDE Sub-TLV
Format IS-IS PPR-PDE Flags Format OSPFv2 PPR TLV Format OSPFv2 PPR TLV Flags Format

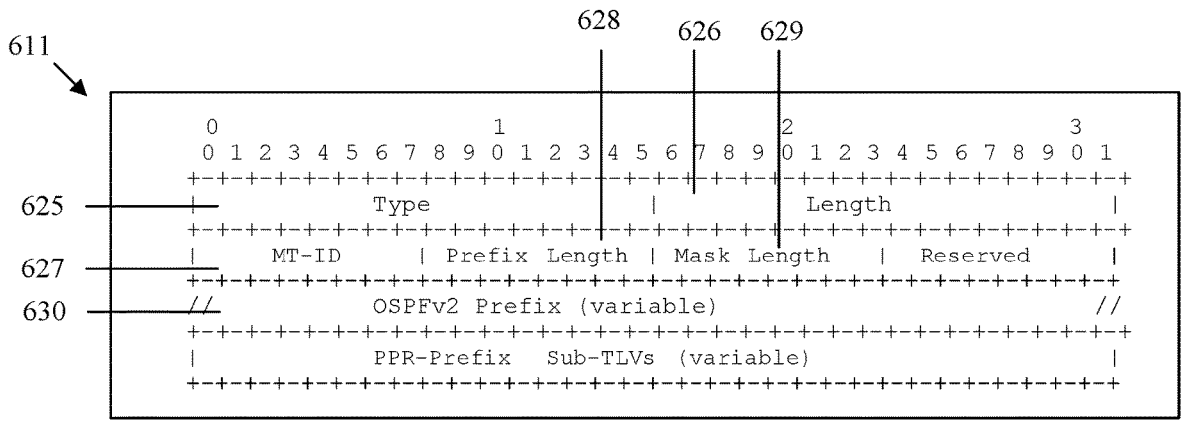
FIG. 6C  OSPFv2 PPR-Prefix Sub-TLV Format
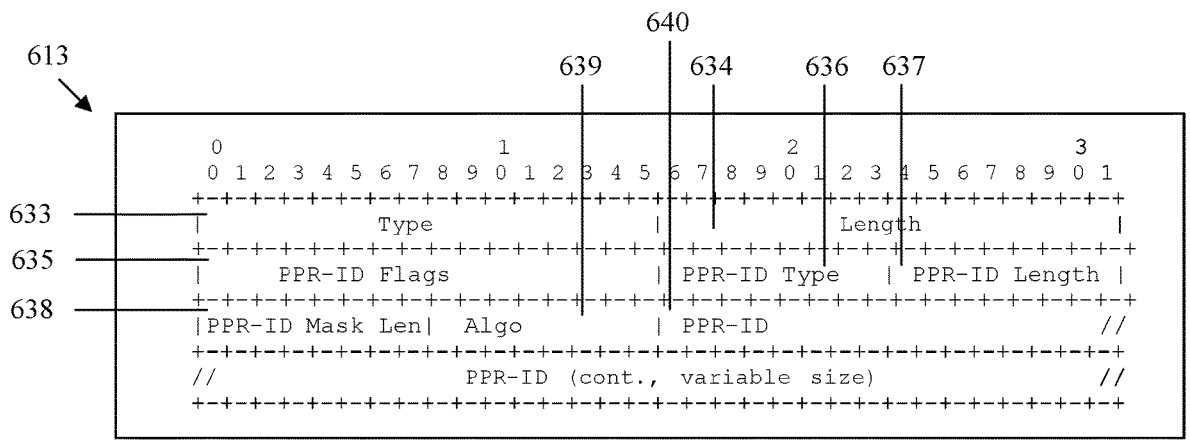
FIG. 6D  OSPFv2 PPR-ID Sub-TLV Format
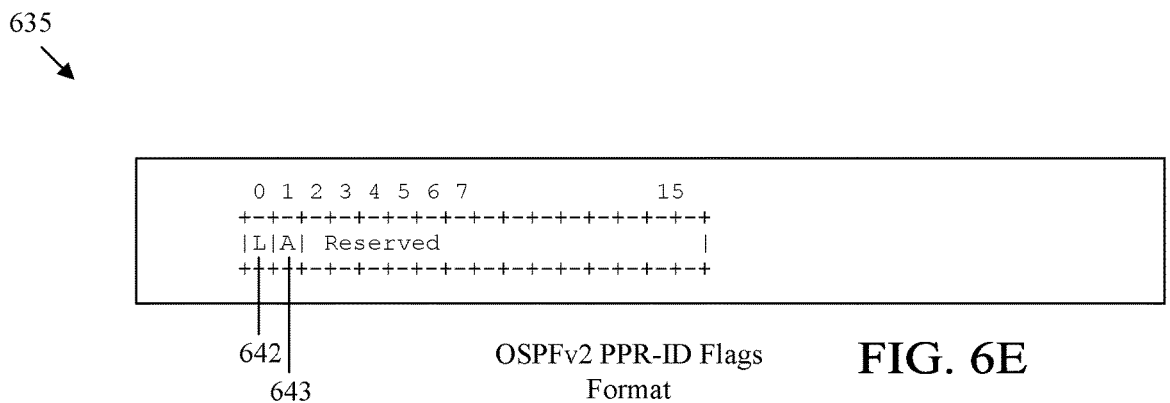
FIG. 6E  OSPFv2 PPR-ID Flags Format OSPFv2 PPR-PDE Sub-TLV
Format OSPFv2 PPR-PDE Flags
Format

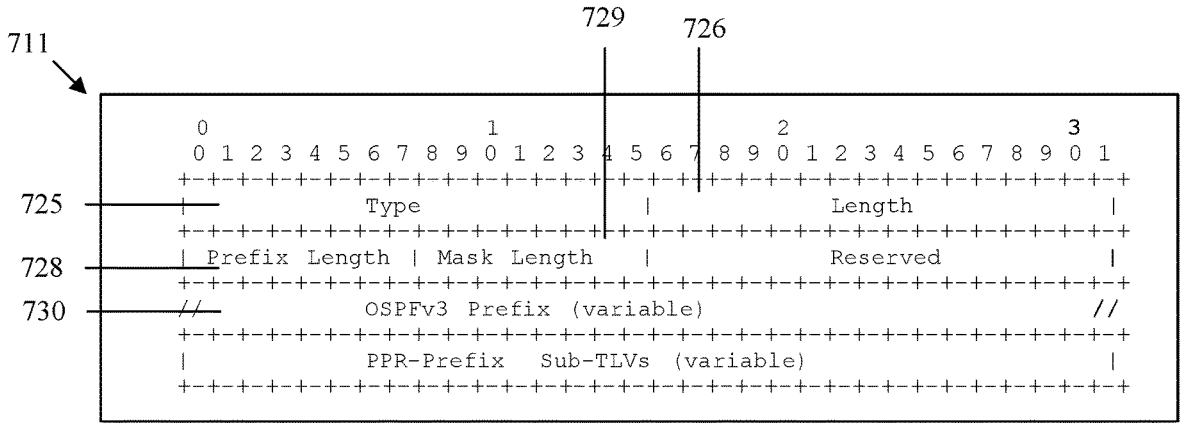
OSPFv3 PPR-Prefix Sub-TLV Format   FIG. 7C
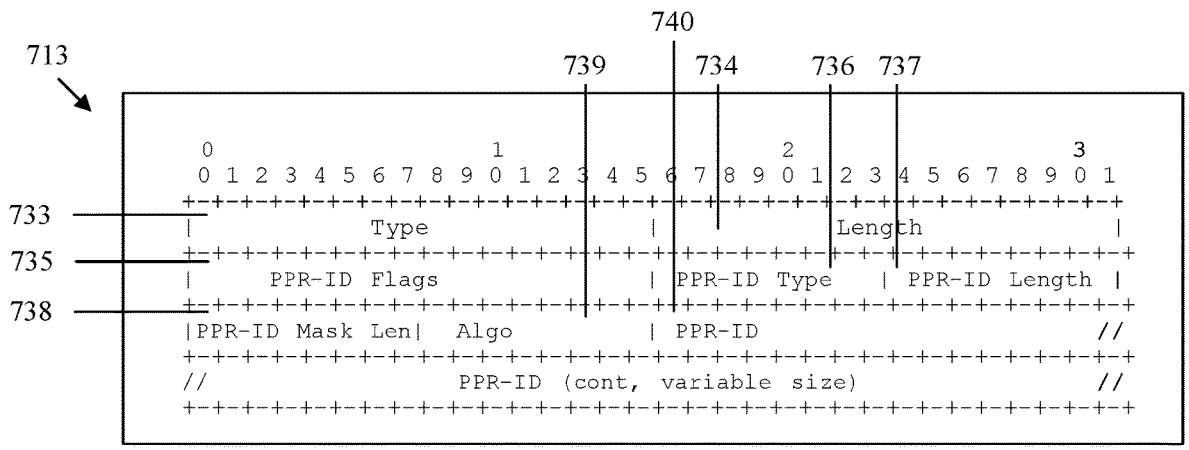
OSPFv3 PPR-ID Sub-TLV Format   FIG. 7D
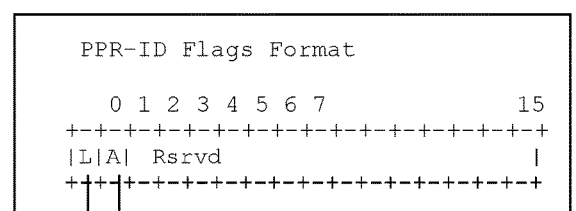
OSPFv2 PPR-ID Flags Format   FIG. 7E OSPFv3 PPR-PDE Sub-TLV Format OSPFv3 PPR-PDE Flags Format

ADVERTISING AND PROGRAMMING PREFERRED PATH ROUTES USING INTERIOR GATEWAY PROTOCOLS

CROSS-REFERENCE TO RELATED APPLICATIONS

The present application is a continuation of International Application No. PCT/US2019/015419 filed on Jan. 28, 2019, by Futurewei Technologies, Inc., and titled "Advertising and Programming Preferred Path Routes using Interior Gateway Protocols," which claims the benefit of U.S. Provisional Patent Application No. 62/634,425 filed Feb. 23, 2018 by Uma S. Chunduri, et. al., and entitled "Advertising and Programming a Non-Shortest Path Forwarding Identifier in Interior Gateway Protocols," all of which are incorporated herein by reference as if reproduced in their entireties.

FIELD OF INVENTION

The present disclosure pertains to the field of source routing and networking. In particular, the present disclosure relates to decreasing the overhead of packets that are transmitted in a network implementing source routing.

BACKGROUND

In a network implementing source routing, a controller that has knowledge of a complete topology of the underlying network can program an ingress node of the network with a custom path that certain traffic has to travel to reach a destination. This custom path may not necessarily be the shortest path between the ingress node and the destination and may be programmed based on traffic engineering or business requirements. An ingress node in the network may use a separate flow classification technique to associate certain traffic flow with a custom path (e.g., a source and/or destination addresses).

In a network implementing segment routing (SR), packets are steered through the network using segment identifiers (SIDs) that uniquely identify segments in the network. A segment may include one or more nodes, interfaces, and links between two nodes in the network. The SIDs are typically carried in the header of the packet.

Currently there are two data planes that use segment routing to provision custom paths in a network—Segment Routing (SR) Multi-Protocol Label Switching (MPLS) (SR-MPLS) and SR-Internet Protocol (IP) Version 6 (IPv6) (SR-IPv6). In SR-MPLS, each segment is encoded as a label, and an ordered list of segments are encoded as a stack of labels in the header of the packet. Similarly, in SR-IPv6, each segment is encoded as an IPv6 address within a segment routing header (SRH).

SUMMARY

According to a first aspect of the present disclosure, there is provided a method implemented by a network element (NE) in a network, comprising receiving, by the NE, an advertisement comprising preferred path route (PPR) information representing a PPR from a source to a destination in the network, the PPR information comprising a PPR identifier (PPR-ID) and a plurality of PPR description elements (PPR-PDEs) each representing an element on the PPR, receiving, by the NE, a data packet comprising the PPR-ID, and forwarding, by the NE, the data packet having the PPR-ID to a next element on the PPR based on the plurality of PPR-PDEs.

In a first implementation of the method according to the first aspect, the method further comprises updating, by the NE, a forwarding database to include an entry including the PPR information for a destination address corresponding to the destination in response to determining that the NE is identified in one of the plurality of PPR-PDEs, and wherein the entry indicates that the data packet including the PPR-ID should be forwarded along the PPR identified by the PPR-ID included in the PPR information.

In a second implementation of the method according to the first aspect or any preceding implementation of the first aspect, the PPR-ID is at least one of a Multi-Protocol Label Switching (MPLS) label, a segment identifier (SID), an Internet Protocol (IP) version 4 (IPv4) address, or an IP version 6 (IPv6) address.

In a third implementation of the method according to the first aspect or any preceding implementation of the first aspect, the PPR deviates from a predetermined shortest path between the source and the destination based on a network characteristic requested by a client.

In a fourth implementation of the method according to the first aspect or any preceding implementation of the first aspect, the method further comprising receiving, by the receiver, traffic engineering (TE) source routed path information relating to a plurality of sources attached to the NE, wherein the TE source routed path information comprises the PPR information for the source of the plurality of sources.

In a fifth implementation of the method according to the first aspect or any preceding implementation of the first aspect, each of the plurality of PPR-PDEs represents a topological element or a non-topological element on the PPR, wherein the topological element comprises at least one of a network element or a link, and wherein the non-topological element comprises at least one of a service, function, or context.

In a sixth implementation of the method according to the first aspect or any preceding implementation of the first aspect, the advertisement comprises a flag set to indicate that the PPR-ID identifies a strict-PPR between the source and the destination, wherein the plurality of PPR-PDEs describes all topological NEs on the PPR.

In a seventh implementation of the method according to the first aspect or any preceding implementation of the first aspect, the advertisement comprises a flag set to indicate that the PPR-ID identifies a loose-PPR between the source and the destination, wherein the plurality of PPR-PDEs describes a subset of topological NEs on the PPR.

In a eighth implementation of the method according to the first aspect or any preceding implementation of the first aspect, the network implements Multi-Protocol Label Switching (MPLS), wherein the data packet comprises a bottom label and a top label, wherein the bottom label comprises the PPR-ID, and wherein the top label comprises a label identifying the next element on the PPR.

According to a second aspect of the present disclosure, there is provided a NE implemented in a network. The NE comprises a receiver configured to receive an advertisement comprising PPR information representing a PPR from a source to a destination in the network, the PPR information comprising a PPR-ID and a plurality of PPR-PDEs each representing an element on the PPR, and receive a data packet comprising the PPR-ID, and a transmitter coupled to the receiver and configured to forward the data packet having the PPR-ID to a next element on the PPR based on the plurality of PPR-PDEs.

In a first implementation of the NE according to the second aspect, the NE further comprises a processor configured to update a forwarding database to include an entry including the PPR information for a destination address of the destination in response to determining that the NE is identified in one of the plurality of PPR-PDEs, and wherein the entry indicates that the data packet including the PPR-ID should be forwarded along the PPR identified by the PPR-ID included in the PPR information.

In a second implementation of the NE according to the second aspect or any preceding implementation of the second aspect, the plurality of PPR-PDEs comprises an ordered list of PDEs describing each element on the PPR, and wherein each of the PPR-PDEs comprises a flag indicating whether the PPR-PDE is a topological element or a non-topological element, wherein the topological element comprises at least one of a network element or a link, and wherein the non-topological element comprises at least one of a service, function, or context.

In a third implementation of the NE according to the second aspect or any preceding implementation of the second aspect, each of the plurality of PPR-PDEs comprises an address of a respective element on the PPR and a PDE-ID that defines a type of the address.

In a fourth implementation of the NE according to the second aspect or any preceding implementation of the second aspect, the advertisement comprises a flag instructing the NE to maintain a count of a number of data packets comprising the PPR-ID transmitted along the PPR.

In a fifth implementation of the NE according to the second aspect or any preceding implementation of the second aspect, the PPR information is received from a central entity of the network.

According to a third aspect of the present disclosure, there is provided a non-transitory medium configured to store a computer program product comprising computer executable instructions that when executed by a processor cause the processor to receive an advertisement comprising PPR information representing a PPR from a source to a destination in a network, the PPR information comprising a PPR-ID and a plurality of PPR-PDEs each representing an element on the PPR, receive a data packet comprising the PPR-ID, and forward the data packet having the PPR-ID to a next element on the PPR based on the plurality of PPR-PDEs.

In a first implementation of the non-transitory medium according to the third aspect, the advertisement comprises a prefix representing the destination and a type of the prefix.

In a second implementation of the non-transitory medium according to the third aspect or any preceding implementation of the third aspect, the advertisement is received from a network element or a central entity of the network.

In a third implementation of the non-transitory medium according to the third aspect or any preceding implementation of the third aspect, the computer executable instructions that when executed by the processor further cause the processor to update a forwarding database to include an entry including the PPR information for a destination address of the destination in response to determining that a current network element is identified in one of the plurality of PPR-PDEs.

In a fourth implementation of the non-transitory medium according to the third aspect or any preceding implementation of the third aspect, the PPR-ID is at least one of a Multi-Protocol Label Switching (MPLS) label, a segment identifier (SID), an Internet Protocol (IP) version 4 (IPv4) address, or an IP version 6 (IPv6) address.

In a fifth implementation of the non-transitory medium according to the third aspect or any preceding implementation of the third aspect, each of the PPR-PDEs comprises an address of a respective element on the PPR.

In a sixth implementation of the non-transitory medium according to the third aspect or any preceding implementation of the third aspect, each of the PPR-PDEs represents a topological element or a non-topological element on the PPR, wherein the topological element comprises at least one of a network element or a link, and wherein the non-topological element comprises at least one of a service, function, or context.

For the purpose of clarity, any one of the foregoing embodiments may be combined with any one or more of the other foregoing embodiments to create a new embodiment within the scope of the present disclosure.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

FIGS. 5A-G, FIGS. 6A-G, and FIGS. 7A-G are diagrams illustrating examples of the advertisement and fields within the advertisement according to various different protocols.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Source routing mechanisms, such as segment routing, have been defined for MPLS and IPv6 data planes. However, networks that implement source routing with MPLS or IPv6 data planes can experience (based on a deployment scenario) considerable problems with respect to increased path overhead, hardware compatibility, and quality of service (QoS). For example, data packets implementing source routing in an MPLS or IPv6 network typically have headers that may include the addresses or labels of each node or segment on the path.

Disclosed herein are various embodiments directed to overcoming the increased path overhead, hardware compatibility, and QoS challenges that occur when implementing segment routing and/or source routing in networks. In an embodiment, Preferred Path Routes (PPRs) (also referred to herein as "preferred path" or "PPR path") between a source and destination are determined, in which the PPRs are paths that are determined based on application or service requirements and may deviate from a pre-determined shortest path between the source and destination. In an embodiment, a network element (NE) in a network receives PPR information describing the PPRs. In an embodiment, the PPR information includes a preferred path routing (PPR) identifier (ID) (PPR-ID) and identifiers of the elements on the PPR. In an embodiment, in the control plane, the NE forwards the PPR information to all of the other NEs in the network in an advertisement. In an embodiment, in the data plane, the NEs in the PPR update local forwarding databases with PPR-ID and determines the respective NE (nexthop information) that is identified in the advertised PPR information. In this way, when the NE receives a data packet including a PPR-ID in the data plane, the NE forwards the data packet along the PPR instead of the shortest path.

Figure 1:
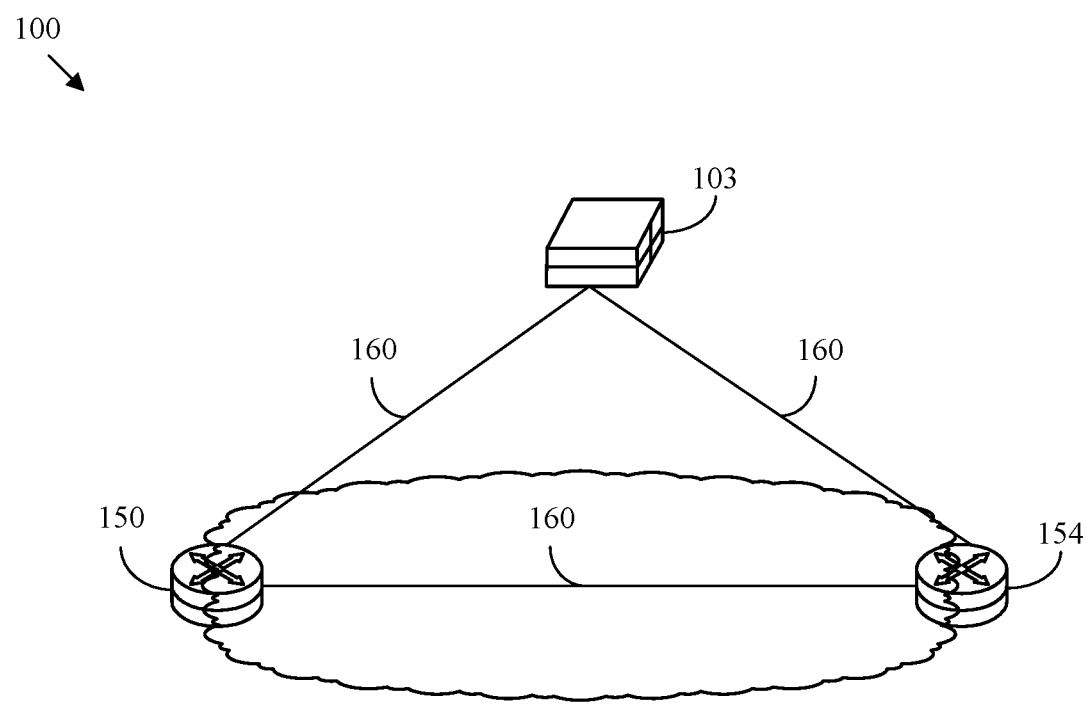
FIG. 1 is a diagram illustrating a network configured to implement preferred path routing according to various embodiments of the disclosure.

FIG. 1 is a diagram illustrating a network 100 configured to implement preferred path routing according to various embodiments of the disclosure. The network 100 comprises a central entity 103 (also referred to herein as a "controller") and two NEs 150 and 154, which are interconnected by links 160. The central entity 103 may be a controller, such as a Path Computation Element (PCE), which is further described in Internet Engineering Task Force (IETF) Request for Comments (RFC) 8281, entitled "Path Computation Element Communication Protocol (PCEP) Extensions for PCE-Initiated LSP Setup in a Stateful PCE Model," by E. Crabbe, dated December 2017. Supposing that the network 100 implements SR-MPLS and SR-IPv6, the central entity 103 may be a Software Defined Network Controller (SDNC), which is further described in the IETF RFC document entitled "Segment Routing Architecture," by C. Filsfils, dated July 2018.

NEs 150 and 154 (also referred to herein as "nodes") may be a physical device, such as a router, a bridge, a virtual machine, a network switch, or a logical device configured to perform switching and routing using the preferred path routing mechanisms disclosed herein. In an embodiment, NEs 150 and 154 may be headend nodes positioned at an edge of the network 100. For example, NE 150 may be an ingress node at which traffic (e.g., control packets and data packets) is received, and NE 154 may an egress node from which traffic is transmitted.

The links 160 may be wired or wireless links or interfaces interconnecting each of the NEs 150 and 154 together and interconnecting each of the NEs 150 and 154 to the central entity 103. While NEs 150 and 154 are shown in FIG. 1 as headend nodes, it should be appreciated that NEs 150 and 154 may otherwise be an intermediate node or any other type of NE. Although only two NEs 150 and 154 are shown in FIG. 1, it should be appreciated that the network 100 shown in FIG. 1 may include any number of NEs. In an embodiment, the central entity 103 and NEs 150 and 154 are configured to implement various packet forwarding protocols, such as, but not limited to, MPLS, IPv4, IPv6, and Big Packet Protocol.

In the network 100, the NEs 150 and 154 may communicate with the central entity 103 in both directions. That is, the central entity 103 may send south bound communications from the central entity 103 to the NEs 150 and 154 using various protocols, such as OPENFLOW, Path Computation Element Protocol (PCEP), or with NetConf/Restconf in conjunction with an YANG data model. The YANG data model is described by the LSR Working Group draft document, entitled "YANG data model for Preferred Path Routing," by Y. Qu, dated Jun. 27, 2018. The NEs 150 and 154 may send north bound communications from the NEs 150 and 154 to the central entity 103 using various protocols, such as Border Gateway Protocol (BGP)-Link State (LS) or IGP static adjacency.

In an embodiment, the central entity 103 generates paths between a source and a destination of the network shown in FIG. 1 using a network topology of the network 100 stored at the central entity 103. For example, the central entity 103 may determine the network topology using advertisements sent by each of the NEs 150 and 154 in the network 100, where the advertisements may include prefixes, SIDs, traffic engineering (TE) information, IDs of adjacent NEs, links, interfaces, ports, and routes.

In one embodiment, the central entity 103 determines a shortest path between a source and destination and one or more PPRs between the source and destination. A shortest path refers to a path between the source and the destination that is determined based on a metric, such as, for example, a cost or weight associated with each link on the path, a number of NEs on the path, a number of links on the path, etc. In an embodiment, a shortest path may be computed for a destination using a Dijkstra's Shortest Path First (SPF) algorithm. A PPR (also referred to herein as a "Non-Shortest Path") refers to a custom path created based on one or more application or service requirements.

In an embodiment, the PPR may be a path that deviates from the shortest path computed for a particular source and destination. The PPRs may be determined based on an application or server request for a path between a source and destination that satisfies one or more network characteristics (such as TE characteristics are obtained by the central entity 103 dynamically through BGP-LS or PCEP) or service requirements. The PPRs and the shortest paths may each comprise a sequential ordering of one or more NEs 150 and 154 on the PPR and/or one or more links 160 on the PPR, which may be identified by labels, addresses, or IDs. An example of the shortest path and the PPR will be further described below with reference to FIG. 2.

In a traditional network implementing SR, a Traffic Engineered (TE) path may be described using segments instead of single hops. As described above, currently there are two data planes that use segment routing to create the TE Paths for the network—SR-MPLS and SR-IPv6.

In SR-MPLS and SR-IPv6 networks, TE-paths and segments, respectively, are provisioned through a central entity 103, such as a PCE or an SDNC. In MPLS and IPv6 networks, the underlying Interior Gateway Protocol (IGP) computes and programs the Routing Information Base (RIB), the Forwarding Information Base (FIB), Label Information Base (LIB), and Label Forwarding Information Base (LFIB) with the next hop determined by the shortest path first (SPF) method at each of the NEs 150 and 154 in the network 100. A RIB/LIB is a routing protocol database of routing prefixes in the control plane, and the FIB/LFIB is used for forwarding and may store a routing table as well as next hop information.

In an SR-MPLS network that implements segment routing, a stack of labels may be pushed onto a data packet that is received at a NE 150, where each label may represent a SID of a segment of the TE path along which to forward the data packet. Each label may indicate a prefix or adjacency segment.

In an SR-IPv6 network that implements segment routing, an extension header is used by listing the path segments on the TE path in the extension header, as is further described in the Network Working Group (NWG) draft document entitled "IPv6 Segment Routing Header (SRH)," by S. Previdi, dated Jan. 20, 2018. The number of SIDs in the stack may be referred to as the maximum SID depth, which must be taken into consideration when transporting a data packet in a network 100 implementing segment routing. Information regarding the factors in considering the maximum SID depth in an Intermediate System-Intermediate System (IS-IS) network is further described in the IS-IS Working Group draft document entitled "Signaling MSD (Maximum SID Depth) using IS-IS," by J. Tantsura, dated Jan. 10, 2018. This information is also further described in the IS-IS Working Group draft document entitled "Signaling Entropy Label Capability and Readable Label-stack Depth Using IS-IS," by X. Xu, dated Jan. 3, 2018.

As described in these documents, the network 100 maintains the NEs 150 and 154 to ensure that the stack of labels and addresses in the SRH can be pushed onto the data packet at the NE 150 and read at the NEs 150 and 154 appropriately. However, this creates the problem of having a relatively large amount of data pushed onto the data packet, which is sometimes even larger than the payload of the data packet itself. For example, when a TE label stack is created based on network characteristics, such as bandwidth, jitter, and latency requirements for a TE path, the transport label itself can range from 4 to 12 labels, which is 16 to 48 bytes. The number of labels in a transport label stack can vary based on deployment parameters and size of the network 100. In this way, the transport label may include much more than 12 labels. This introduces a significant cost of transporting packets including these label stacks, particularly for devices that send packets that contain only small payloads, but of which there may be very many, such as Internet of Things (IoT) devices.

This problem is exacerbated in the IPv6 data plane when, for example, even with 4 to 8 segments in the SRH, the header may include 40 bytes of an IPv6 encapsulation, 8 bytes of the SRH, and 63 to 128 bytes of IPv6 segments in the SRH, which totals out to between 112 to 176 bytes. Therefore, in both of these networks, the transport part of the overhead is between 16 to 176 bytes for a relatively small actual data payload of 1 to 3 bytes, without even including other types of encapsulation applicable to these networking environments.

In addition, certain protocols require a certain label or indicator to be placed at a certain position on the stack. For example, the Entropy Label Indicator (ELI), the Entropy Label (EL), and the capability ELI should be appropriately placed at a certain position on the label stack. Therefore, the stack of SIDs has to be manipulated for networks using entropy labels, which is further defined in IETF RFC 6790, entitled "The Use of Entropy Labels in MPLS Forwarding," by K. Kompella, dated November 2012. In addition, a network implementing IP version 4 (IPv4 network) may not even be configured to route data packets on a network service platform (NSP), and thus, may only direct packets to the next hop based on the shortest path without being encapsulated using MPLS or other hop-by-hop encapsulations (IPv4/IPv6/GRE/UDP which can quickly add up to the layers of network overhead).

Embodiments of the present disclosure are directed to methods, systems, and apparatuses configured to eliminate the need to use SR-Label stack or an SRH to encode NEs 150 and 154 in the network 100 to transmit packets along a PPR instead of the shortest path. In the control plane, the central entity 103 determines TE path information, which relates to sources that are attached to the headend NE 150 or 154. In an embodiment, the TE path information includes PPR information for a particular PPR between a source and destination pair. In an embodiment, the PPR information includes a PPR-ID (also referred to herein as an "NSP forwarding ID" (NSPF-ID)) identifying the PPR and one or more preferred path routing-path description elements (PPR-PDEs) (also referred to herein as "path IDs") describing each of the elements on the PPR in sequential order. The central entity 103 sends the TE path information including the PPR information to a NE 150 or 154 in the network 100.

Continuing with the control plane, in an embodiment, each NE 150 and 154 in the network 100 may be configured to store the PPR information and advertise PPRs received from the central entity 103 by sending an advertisement comprising the PPR information to all the other NEs 150 or 154 in the network 100, as will be further described below with reference to FIG. 2. In an embodiment, the advertisement may include the PPR information, such as a PPR-ID and one or more PPR-PDEs, each describing an element on the PPR. Each of the NEs 150 and 154 in the network 100 that receives the advertisement first determines whether the NE 150 or 154 is identified in the PPR-PDEs for one or more of the advertised PPRs. If so, then the NE 150 or 154 updates a locally stored forwarding database to indicate that data packets including this particular PPR-ID should be routed along the PPR instead of the predetermined shortest path.

In the data plane, when the NE 150 or 154 receives data packets, the NE 150 or 154 inspects the data packet to determine whether a PPR-ID is included in the data packet. In an embodiment, the PPR-ID may be included in a header of the data packet. If a PPR-ID is included in the data packet, the NE 150 or 154 performs a lookup on the locally stored forwarding database to determine the next PPR-PDE associated with the PPR-ID identified in the data packet. The PPR-PDE in the locally stored forwarding database indicates a next hop (another NE, link, or segment) by which to forward the data packet. The NE 150 or 154 forwards the data packet to the next hop based on the PPR-PDE indicated in the locally stored forwarding database. In this way, the NEs 150 or 154 in the network are configured to transmit data packets via the PPR instead of the shortest path.

While FIG. 1 shows network 100 comprising a central entity 103 configured to determine and send PPR information to the NE 150 or 154, the NE 150 or 154 may receive the PPR information through other sources as well. In an embodiment, an operator can configure one of the NEs 150 and 154 in the network 100 to include and store the TE source routed path information. In this case, the NE 150 or 154 is still configured to send advertisements including the PPR information to all the other NEs 150 and 154 in the network 100. In an embodiment in which the network 100 does not implement an IGP flooding mechanism, the central entity 103 may be a controller that is connected to every NE 150 and 154 in the network 100. In this embodiment, the central entity 103 is manually configured to send advertisements including the PPR information to all the other NEs 150 and 154 in the network 100 instead of just sending the advertisement to the single NE 150 or 154.

In a typical network implementing segment routing, the NEs 150 and 154 that receive the PPR information from the central entity 103 store the information in a local forwarding database such that the information can be looked up when a data packet that should be forwarded on the PPR is received. Traditionally, when a data packet that should be forwarded on the PPR is received by the NE 150 or 154, the NE 150 or 154 pushes the stack of labels, addresses, or IDs identifying each of the NEs on the PPR onto the data packet. As the data packet is forwarded along the PPR, each of the NEs on the PPR pops off the top element of the stack (in this case the underlying data plane uses MPLS), which is the ID of the next segment or hop. As described above, the use of the stack in path forwarding is inefficient and wasteful. Therefore, in an embodiment of the disclosure, each of the NEs 150 and 154 advertise, transmit, or flood the PPR information received from the central entity 103 along with the data plane identifier for the path PPR-ID to all of the different NEs 150 and 154 in the network 100. In this way, the use of the stack in forwarding a data packet along a PPR is eliminated.

Figure 2:
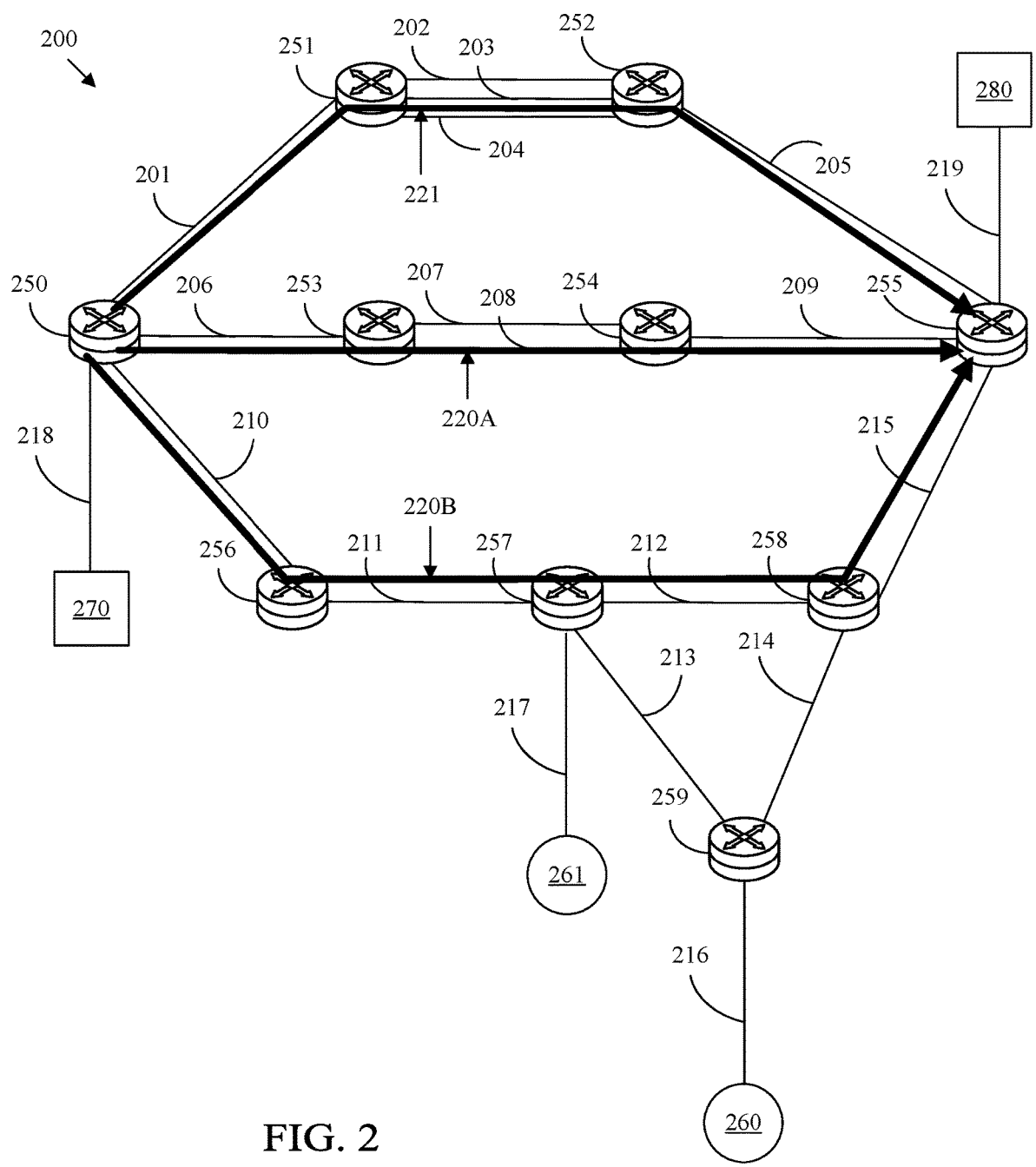
FIG. 2 is a diagram illustrating a network configured to implement preferred path routing according to various embodiments of the disclosure.

FIG. 2 is a diagram of a network 200 configured to implement preferred path routing according to various embodiments of the disclosure. Network 200 is similar to network 100, except that network 200 includes a source 270, a destination 280, and elements 201-219 and 250-261. Elements 201-219 and 250-261 include NEs 250-261 and links 201-219. The source 270 is coupled to the NE 250 via link 218, and the destination 280 is coupled to the NE 255 via link 219. The NEs 250-261 are interconnected by links 201-217."

Network 200 includes both topological NEs and non-topological NEs. Topological NEs refer to physical devices, such as NEs 250-259 and links 201-219. Non-topological NEs refer to non-physical devices, such as NEs 260-261, which are further described below.

The NEs 250-259 are topological NEs, which are similar to the NEs 150 and 154 described in FIG. 1, in that each of the topological NEs 250-259 is a physical device, such as a router, bridge, a network switch, or any other type of device, configured to perform switching and routing using the PPR mechanisms disclosed herein.

The NEs 260-261 are non-topological NEs, such as, for example, a function, context, service, or a virtual machine. As shown by FIG. 2, the non-topological NE 260 is attached to or hosted by the NE 259, and the non-topological NE 261 is attached to or hosted by the NE 257. In an embodiment, a non-topological NEs 260 or 261 may be hosted directly at the respective attached topological NE 257 or 259. In an embodiment, the non-topological NE 260 or 261 may be executed at another node, device, or server external to the respective attached topological NE 257 or 259.

The links 201-219 are also topological NEs, which are similar to the links 160 described in FIG. 1, in that each of the links 201-219 may be a wired or wireless link configured to interconnect the NEs 250-261, the source 270, and the destination 280.

As shown by FIG. 2, some of the NEs may be interconnected by more than one link. For example, NEs 251 and 252 are interconnected by links 202, 203, and 204. Similarly, NEs 253 and 254 are interconnected by links 207 and 208. As disclosed herein, the term elements 201-219 and 250-261 may refer to one or more of topological NEs 250-259, non-topological NEs 260-261, and/or links 201-219 within network 100.

Each of the links 201-219 is associated with a bi-directional metric, or a weight associated with transmitting data across the respective link 201-219. For example, the bi-directional metric for a link 201-219 may be a cost associated with a timing to transmit a packet across a link, a distance that the packet is transmitted across, a physical cost of transmitting a packet across a link, a bandwidth proportion used by transmitting a packet across a link, a number of intermediary nodes present on a link between two end nodes, etc. The bi-directional metrics are used to compute a shortest path between a source and a destination, which will be further described below.

In an embodiment, the ingress NE 250 receives PPR information indicating one or more PPRs between a source and a destination (e.g., source 270 and destination 280) computed based on the network characteristics or performance characteristics requested by an application or service at the source 270. In the control plane, the ingress NE 250 receives one or more control packets from the central entity 103 (see FIG. 1) including PPR information for PPRs related to all sources (e.g., source 270) attached to the ingress NE 250. In an embodiment, an operator of network 200 may input the PPR information for PPRs related to all sources attached to the ingress NE 250 into the ingress NE 250.

The PPR information may include a PPR-ID identifying a PPR and an ordered list of PPR-PDEs. In an embodiment, the PPR-ID includes a single label or destination address describing and identifying the PPR. For example, when network 200 implements SR-MPLS, the PPR-ID may be an MPLS label or an SID identifying a PPR. When the network 200 implements SRv6, the PPR-ID may be an SRv6 SID identifying a PPR. When the network 200 implements IPv4, the PPR-ID may be an IPv4 address or prefix identifying a PPR. Similarly, when the network 200 implements IPv6, the PPR-ID may be an IPv6 address or prefix identifying a PPR.

In an embodiment, the PPR-PDEs include details regarding one or more of the topological NEs 250-259, non-topological NEs 260-261, and/or links 201-219 on the PPR. In an embodiment, the PPR-PDEs include a sequential ordering of MPLS labels, IPV6 addresses, or IPv4 addresses that specify the actual path (e.g., one or more of the topological NEs 250-259, non-topological NEs 260-261, and/or links 201-219) toward a destination address (also referred to herein as a prefix).

In various embodiments, two types of PPRs may be described by the PPR-PDEs, a strict PPR and a loose PPR. In a strict PPR, every single topological NE 250-259 along the PPR is specified or described in its own PPR-PDE. In a loose PPR, certain hops along a PPR may be skipped such that only a subset of the topological NEs 250-259, links 201-219, or segments along a PPR is specified or described in its own PPR-PDE. When loose PPRs are described by the PPR-PDEs, the topological NEs 250-259 along the path use shortest path routing in between elements that are not explicitly specified in a PPR-PDE (i.e., to reach the next topological PDE of the loose PPR).

After receiving the PPR information, ingress NE 250 advertises the PPR information to all of the other topological NEs 251-259 in the network 200 using the underlying IGP of network 200 via the various protocols described above. In another embodiment, the central entity 103, such as a controller, directly sends all the PPR information to all the topological NEs 250-259 in the network 200.

After the PPR information is advertised, each of the NEs 251-259 that received the PPR information computes and programs the PPRs on the data plane. For example, after NE 250 advertises the PPR information to the other NEs 251-259, each of the other NEs 251-259 first determines whether that particular topological NE 251-259 or an attached non-topological NE 260-261 is identified in the PPR-PDEs of the PPR information. The other NEs 251-259 are configured to ignore the advertisement when the other NEs 251-259 or the other non-topological NEs 160-161 attached to the other NEs are not identified in the PPR-PDEs of the PPR information.

In an embodiment, the other topological NEs 251-259 that are identified in the PPR-PDEs of the PPR information are each configured to update a local forwarding database to include an entry including the PPR information for a destination address corresponding to the destination 280. In an embodiment, the other topological NEs 251-259 update a local forwarding database to include an entry including the PPR information for a destination address corresponding to the destination 280 when a non-topological NE 260-261 attached to the other topological NE 251-259 is identified in the PPR-PDEs of the PPR information. In an embodiment, the local forwarding database is updated by adding another entry for a particular destination ID or address that includes the PPR-ID, each of the PPR-PDEs corresponding the PPR-ID, and/or an ID or address of the next node on the PPR to which to forward a data packet.

In an embodiment in which the PPR-PDEs include an ID of a non-topological NE 260-261, a topological NE 250-259 is also configured to determine whether any of the non-topological NEs 260-261 attached to or hosted by the respective topological NEs 259 and 257 are identified in the PPR-PDEs of the PPR information. For example, when the topological NE 257 receives an advertisement with PPR information, the topological NE 257 determines whether the topological NE 257 and/or the non-topological NE 261 are identified in the PPR-PDEs of the advertisement. The topological NE 257 may inspect the advertisement to determine whether an ID of the non-topological NE 261 is included in the PPR-PDEs of the advertisement. Similarly, when the topological NE 259 receives an advertisement with PPR information, the topological NE 259 determines whether the topological NE 259 and/or the non-topological NE 260 are identified in the PPR-PDEs of the advertisement.

In an embodiment, the topological NE 257 ignores advertisements that do not include information regarding topological NE 257 and/or non-topological NE 261. Similarly, the topological NE 259 ignores advertisements that do not include information regarding topological NE 259 and/or non-topological NE 260.

In an embodiment, when the non-topological NEs 260-261 is directly hosted at a topological NE 259 or 257, the topological NE 259 or 257 updates the local forwarding database by adding another entry for a particular destination ID or address that includes the PPR-ID to indicate that a data packet including the PPR-ID should be processed by a non-topological NEs 260-261 before being forwarded to a next hop identified by the PPR-PDEs.

In an embodiment, when an advertisement that includes information regarding an attached non-topological NE 260-261 is received, the topological NEs 257 and 259 each update a local forwarding database to indicate that a data packet including the PPR-ID should be forwarded to the next element (e.g., the identified non-topological NE 260-261).

For example, the topological NEs 257 and 259 are each configured to add an entry in the forwarding database for the destination address and the PPR-ID identified in the advertisement, in which the entry includes the advertised identifier of the attached non-topological NE 260-261. When the topological NE 257 receives a data packet including the PPR-ID and/or the destination address, the topological NE 257 performs a lookup on the forwarding database based on the PPR-ID and/or the destination address to obtain the entry that includes the identifier of the attached non-topological entry 261. Based on the lookup, the topological NE 257 forwards the packet to the non-topological NE 261, which may perform a function, service, or context on the data packet.

In an embodiment, after the function, service, or context is hosted at the non-topological NE 261, the non-topological NE 261 forwards the data packet back to topological NE 257. In this embodiment, the topological NE 257 performs another lookup on the forwarding database to determine the next element toward which to forward the data packet.

In another embodiment, the non-topological NE 261 may perform a similar lookup to determine the next element (topological NE 250-259, non-topological NE 260-261, or link 201-219) toward which to forward the data packet. In this embodiment, the non-topological NE 261 forwards the data packet to the next element identified by the PPR-PDEs identified in the advertisement. Topological NE 260 performs similar steps with regard to received data packets and the attached non-topological NE 259.

Even though NEs 250-259 include forwarding information in the local forwarding database to transmit data for a destination address through the shortest path 221, the NEs 250-259 also include forwarding information in the local forwarding database transmit data to the destination through PPRs 220A-B. In an embodiment, network 200 determines PPRs 220A-B based on network characteristics or performance characteristics requested by an application or service at the source 270. In an embodiment, the network characteristics or performance characteristics refer to at least one of bandwidth, jitter, latency, throughput, or error rate.

A first PPR 220A may be identified by PPR-ID=2 and may include the path of {NE 250, NE 253, NE 254, and NE 255} for a prefix (or destination address) associated with egress NE 255. A second PPR 220B may be identified by PPR-ID=3 and may include the path of {NE 250, NE 256, NE 257, NE 258, and NE 255}. The second PPR 220B is shown and described in FIG. 2 as a strict PPR 220B because the path of {NE 250, NE 256, NE 257, NE 258, and NE 255} includes every single NE on the PPR 220B. However, in an embodiment, the second PPR 220B may otherwise be a loose PPR 220B in which the PPR-PDEs describing the loose PPR 220B only include a subset of NEs on the PPR 220B. In this case, the PPR-PDEs used in PPR information describing the loose PPR 220B may only include details regarding {NE 250, NE 256, NE 258, and NE 255}.

In the control plane, in an embodiment, the central entity 103 may send the PPR information comprising [PPR-ID=2 and {NE 250, NE 253, NE 254, and NE 255}] and [PPR-ID=3 and {NE 250, NE 256, NE 257, NE 258, and NE 255}] for the prefix of egress NE 255 to the ingress NE 250. The PPR information may include labels, addresses, or IDs of one or more of the elements 201-219 and 250-261 (e.g., topological NEs 250-259, non-topological NEs 260-261, and links 201-219) both of the PPRs 220A-B that are being advertised. In the case in which PPR 220B is described as a loose PPR 220B, then the PPR information describing PPR 220B includes [PPR-ID=3 and {NE 250, NE 256, NE 258, and NE 255}].

Continuing with the control plane implementation, after the ingress NE 250 receives the PPR information, the ingress NE 250 may update a local forwarding table to include the PPR information. In an embodiment, ingress NE 250 may identify the entry in a local forwarding database that corresponds to the prefix or destination address of egress NE 255 for the first and second PPRs 220A-B. In an embodiment, the ingress NE 250 may then add two more entries corresponding to this destination or prefix, in which the first entry includes the PPR information for the first PPR 220A [PPR-ID=2 and {NE 250, NE 253, NE 254, and NE 255}] and the second entry includes the PPR information for the second PPR 220B [PPR-ID=3 and {NE 250, NE 256, NE 257, NE 258, and NE 255}] for the prefix of egress NE 255. In an embodiment, the entries may include the PPR-ID and the labels, addresses, or IDs of one or more of the elements 201-219 and 250-261 (topological NEs 250-259, non-topological NEs 260-261, or links 201-219) on the PPR 220A-B. In the case in which PPR 220B is described as a loose PPR 220B, then the second entry includes the PPR information for the second PPR 220B [PPR-ID=3 and {NE 250, NE 256, NE 258, and NE 255}] for the prefix of egress NE 255.

Continuing with the control plane implementation, in an embodiment, ingress NE 250 advertises the PPR information to all the other topological NEs 251-259 in the network 200. An example of the advertisement may be further described below with reference to FIGS. 4-7. All the other topological NEs 251-259 may update the local forwarding database to include the PPR information in a manner similar to how ingress NE 250 updates the local forwarding database.

Each receiving NE 251-259 determines whether the respective NE 251-259 or attached non-topological NEs 260-261 is identified in the PPR information being advertised. For example, suppose NE 257 receives the PPR information. NE 257 may be configured to ignore the first PPR 220A identified by PPR-ID=2 because this PPR 220A does not include NE 257. However, NE 257 determines that the second PPR 220B identified by PPR-ID=3 does identify the NE 257 and a destination address or prefix of the egress NE 255. Therefore, NE 257 updates the local forwarding database to include an entry for the destination address or prefix of NE 255 to include the PPR information related to PPR 220B.

In an embodiment, NE 257 updates the local forwarding database to include a label, address, or ID of the next NE 258 on PPR 220A-B toward which to transmit a data packet comprising the PPR-ID of 3. In an embodiment, NE 257 updates the local forwarding database to include all of the PPR-PDEs related to all of the elements 201-219 or 250-261 (topological NEs 250-259, non-topological NEs 260-261, or links 201-219) on the second PPR 220B.

After performing the control plane implementation steps described above, the embodiments disclosed herein enable the NEs 250-259 to forward data packets along the PPRs 220A-B in the data plane when the data packet includes a particular PPR-ID. In the data plane, after updating the local forwarding database, NE 250-259 may now be configured to inspect data packets to first determine whether the PPR-ID is included in the data packet. In an embodiment, the PPR-ID may be included in the header of the data packet. When the PPR-ID is included in the data packet, the NEs 250-259 are configured to forward the data packet along the PPR 220A-B instead of the shortest path based on the PPR-PDEs stored in association with the PPR-ID in the local forwarding database. For example, NE 257 forwards the data packet comprising the PPR-ID of 3 to NE 258 instead of NE 259.

In the data plane of a network implementing MPLS, a strict PPR 220A-B may be implemented in data packets using an MPLS label or SID type that includes the PPR-ID. In the data plane of a network implementing MPLS, a loose PPR 220B may be implemented in data packets using two MPLS labels. In an embodiment, the top label includes a shortest path label or an SID of a next element 201-219 and 250-261 on the PPR 220B, and the bottom label includes the PPR-ID.

For example, a data packet may be received by the ingress NE 250 with a top label including the PPR-ID of 3 identifying a loose PPR 220B ({NE 250, NE 256, NE 258, and NE 255}). Each of the NEs 250, 256, 258, and 255 on the loose PPR 220B includes entries in a local forwarding database identifying the next element 201-219 and 250-261 on the PPR 220B based on the PPR information describing loose PPR 220B that was flooded through the network 200. In an embodiment, of the NEs 250-259 adds an another MPLS label on "top" of the MPLS label identifying the PPR-ID. The top MPLS label includes a shortest path label or SID of a next element 201-219 and 250-261 on the PPR 220B in response to identifying that the next element 201-219 and 250-261 on the PPR 220B included in the local forwarding database is not attached to the current NE 250-259. For example, when NE 256 receives the data packet in which the first MPLS label includes the PPR-ID of 3, the NE 256 performs a lookup at the local forwarding database to determine that the next element 201-219 and 250-261 on the PPR 220B is advertised as being NE 258, which is not directly attached to NE 256. In an embodiment, NE 256 then adds the another label on top of the first MPLS label, in which the another label identifies NE 258. In an embodiment, NE 256 then identifies the next hop by which to transmit the data packet according to the shortest path based on the LSDB, which indicates the next hop in the shortest path. The NE 256 then forwards the data packet according to the next hop in the shortest path, which may be NE 257. NE 257 performs the native MPLS shortest path forwarding again to determine the next hop in the shortest path to NE 258, and then forwards to data packet to NE 258. In an embodiment, once the data packet reaches NE 258, which is identified in the local forwarding database as being an element 201-219 and 250-261 on the PPR 220B, the NE 258 pops off the second label from the data packet. In this way, data packets transmitted through PPRs 220A-B advertised using loose PPRs 220A-B utilize both the PPR-ID and shortest path mechanisms.

Figure 3:
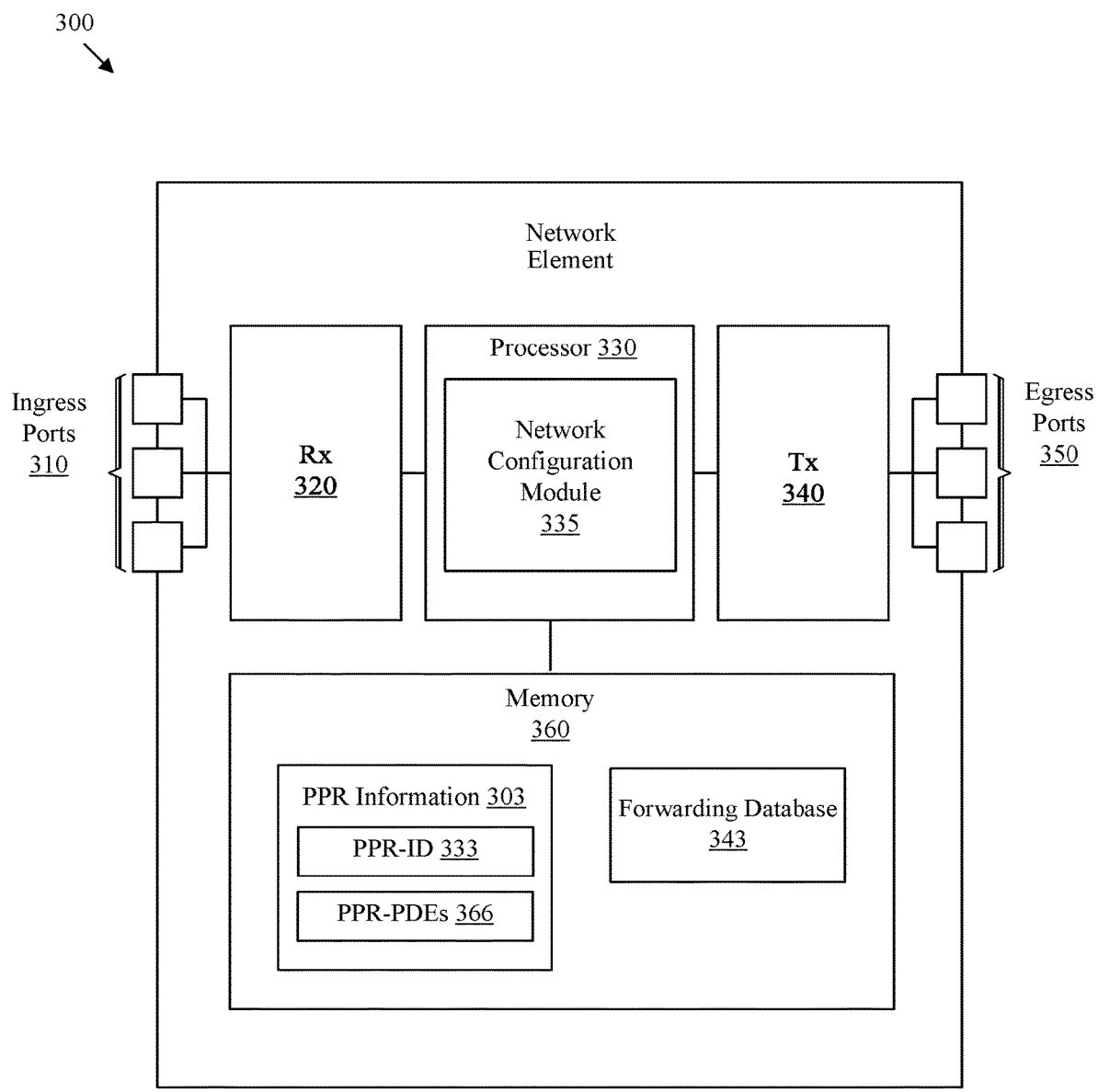
FIG. 3 is an embodiment of an NE in a network configured to implement preferred path routing according to various embodiments of the disclosure.

FIG. 3 is a diagram of an embodiment of an NE 300 in a network such as the network 100 or 200. NE 300 may be implemented as the central entity 103 or the NEs 250-261. The NE 300 may be configured to implement and/or support the routing mechanisms described herein. The NE 300 may be implemented in a single node or the functionality of NE 300 may be implemented in a plurality of nodes. One skilled in the art will recognize that the term NE encompasses a broad range of devices of which NE 300 is merely an example. While NE 300 is described as a physical device, such as a router or gateway, the NE 300 may also be a virtual device implemented as a router or gateway running on a server or a generic routing hardware (whitebox).

The NE 300 is included for purposes of clarity of discussion, but is in no way meant to limit the application of the present disclosure to a particular NE embodiment or class of NE embodiments. At least some of the features and/or methods described in the disclosure may be implemented in a network apparatus or module such as a NE 300. For instance, the features and/or methods in the disclosure may be implemented using hardware, firmware, and/or software installed to run on hardware. As shown in FIG. 3, the NE 300 comprises one or more ingress ports 310 and a receiver unit (Rx) 320 for receiving data, at least one processor, logic unit, or central processing unit (CPU) 330 to process the data, transmitter unit (Tx) 340 and one or more egress ports 350 for transmitting the data, and a memory 360 for storing the data.

The processor 330 may comprise one or more multi-core processors and be coupled to a memory 360, which may function as data stores, buffers, etc. The processor 330 may be implemented as a general processor or may be part of one or more application specific integrated circuits (ASICs) and/or digital signal processors (DSPs). The processor 330 may comprise a network configuration module 335, which may perform processing functions of the central entity 103 or the NEs 250-259. The network configuration module 335 may also be configured to perform the steps of methods 800, 900, and 1000, and/or any other method discussed herein. As such, the inclusion of the network configuration module 335 and associated methods and systems provide improvements to the functionality of the NE 300. Further, the network configuration module 335 effects a transformation of a particular article (e.g., the network) to a different state. In an alternative embodiment, network configuration module 335 may be implemented as instructions stored in the memory 360, which may be executed by the processor 330.

The memory 360 may comprise a cache for temporarily storing content, e.g., a random-access memory (RAM). Additionally, the memory 360 may comprise a long-term storage for storing content relatively longer, e.g., a read-only memory (ROM). For instance, the cache and the long-term storage may include dynamic RAMs (DRAMs), solid-state drives (SSDs), hard disks, or combinations thereof. The memory 360 may be configured to store the PPR information 303, which includes PPR-IDs 333 and the PPR-PDEs 366, as will be further described below with reference to FIGS. 4-7. In addition, the memory 360 is configured to store the forwarding database 343. In an embodiment, the forwarding database 343 stores entries describing forwarding rules for how a particular NE 300 (e.g., NE 250-259 of FIG. 2) should forward a data packet that includes a PPR-ID 333 and/or a destination address.

It is understood that by programming and/or loading executable instructions onto the NE 300, at least one of the processor 330 and/or memory 360 are changed, transforming the NE 300 in part into a particular machine or apparatus, e.g., a multi-core forwarding architecture, having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an ASIC, because for large production runs the hardware implementation may be less expensive than the software implementation. Often a design may be developed and tested in a software form and later transformed, by well-known design rules, to an equivalent hardware implementation in an ASIC that hardwires the instructions of the software. In the same manner as a machine controlled by a new ASIC in a particular machine or apparatus, likewise a computer that has been programmed and/or loaded with executable instructions may be viewed as a particular machine or apparatus. In some embodiments, the NE 300 may be configured to implement Open Shortest Path First (OSPF) Version 2 (OSPFv2), OSPFv3, IS-IS or direct SDN controller based on network implementations.

Figure 4A:
FIG. 4A is a diagram illustrating an advertisement including PPR information that is forwarded to all NEs in a network according to various embodiments of the disclosure.

FIG. 4A shows a diagram illustrating an example of an advertisement 400 that includes PPR information 303 (see FIG. 3) and is sent to all the topological NEs 251-259 (see FIG. 2) or non-topological NEs 260-261 (see FIG. 2) in the network 200 (see FIG. 2). Continuing with the example described above with reference to FIG. 2, the ingress NE 250 sends the advertisement 400 including the PPR information 303 regarding the first PPR 220A [PPR-ID=2 and {NE 250, NE 253, NE 254, and NE 255}] and the second PPR 220B [PPR-ID=3 and {NE 250, NE 256, NE 257, NE 258, and NE 255}] to NEs 251-259. In an embodiment, ingress NE 250 sends the PPR information 303 to all other NEs 251-259 in the network 200 in response to receiving the PPR information 303 either from a central entity 103 (see FIG. 1) or an operator of the network.

The diagram shown in FIG. 4A is a Type-Length-Value (TLV) of the advertisement 400 showing at least a portion of the different fields that are included in the advertisement 400. As shown in FIG. 4A, the advertisement 400 includes a type field 403, a length field 406, a flags field 409, a prefix-length field 412, a MT-ID field 415, a prefix field 418 (also referred to herein as an FEC/prefix field), a PPR-ID field 421, a PPR Type field 424, a PPR-PDEs field 427 (also referred to herein as a path field), an attributes field 430, and/or a non-path sub-TLVs field 433. The PPR-PDEs field 427 includes PPR-PDE fields 427A-N. In an embodiment, each of the PPR-PDE fields 427A-N includes a label, address, or ID of an element 201-219 or 250-261 (e.g., topological NEs 250-259, non-topological NEs 260-261, or links 201-219) on the PPR 220A-B. While the advertisement 400 is only shown to include these fields, it should be appreciated that the advertisement 400 may include any additional fields as necessary to include information regarding the PPR 220A-B from a source 270 to a destination 280 in the network 200.

The type field 403 may include, for example, a value indicating that part of the advertisement 400 includes a PPR-ID 333 and information identifying the PPR (PPR-PDEs 366). The length field 406 indicates a size of the value of the field shown in the advertisement 400. The flags field 409 includes various flags that may be used to encode or decode the content of the advertisement 400, examples of which will be further described below with reference to FIGS. 5-7.

In an embodiment, there may be a flag in the flags field 409 that indicates whether the address of the destination 280 identified in the prefix field 418 is an IPv4 or IPv6 address. There may also be a flag in the flags field 409 that indicates whether an NE 251-259 that receives the advertisement 400 should configure itself to keep a counter that tracks a number of times the NE 251-259 forwards a data packet along the PPR 220A-B identified by the advertisement 400. In this way, the NE 251-259 that receives this advertisement 400 with this flag may be configured to keep a count of how many times the NE 251-259 has forwarded the data packet along the PPR 220A-B identified by the advertisement 400. There may also be a flag in the flags field 409 that indicates whether a particular PPR 220A-B is in a withdrawn or forwarding state or whether the route/label itself is deleted. The MT-ID 415 field includes the multi-topology ID defined with the four most significant bits reset on transmission and ignored at the receiving end. The remaining 12-bit field contains the MT-ID.

The prefix-length field 412 may include, for example, a value representing a number of leftmost continuous bits of the destination address or ID included in the prefix field 418. In an embodiment, the prefix field 418 includes an address or ID of the destination 280 of the PPR 220A-B described by the advertisement 400.

The PPR-ID field 421 may carry the PPR-ID 333. The PPR-ID 333 is the ID that uniquely identifies a PPR 220A-B. For example, the PPR-ID 333 of 2 may be included when the advertisement 400 includes information regarding the first PPR 220A [PPR-ID=2 and {NE 250, NE 253, NE 254, and NE 255}], and the PPR-ID 333 of 3 may be included when the advertisement 400 includes information regarding the second PPR 220B [PPR-ID=3 and {NE 250, NE 256, NE 257, NE 258, and NE 255}]. In an embodiment, the PPR-ID 333 may be generated by the central entity 103 and sent to the ingress NE 250. In another embodiment, ingress NE 250 may be configured to generate the PPR-ID 333 for each of the PPRs 220A-B defined in a message received from the central entity 103.

The PPR type field 424 carries a PPR type. The PPR type defines the kind or type of the labels, addresses, or IDs of the elements 201-219 and 250-261 (topological NEs 250-259, non-topological NEs 260-261, or links 201-219) on the PPR 220A-220B are encoded in the PPR-PDEs field 427. For example, there may be different preset values that correspond to different ways that a PPR-ID 333 may be encoded. The PPR-ID 333 may be encoded in many different ways, such as, for example, as an IPv4 address, IPv6 address, or MPLS label.

When the PPR-PDEs field 427 includes MPLS labels for one or more of the elements 201-219 and 250-261 on the PPR 220A or 220B, then the PPR type may include the preset value that corresponds to MPLS labels. When the PPR-PDEs field 427 includes IPv4 addresses for one or more of the elements 201-219 and 250-261 on the PPR 220A-B, then the PPR type may include the preset value that corresponds to IPv4 addresses. When the PPR-PDEs field 427 includes IPv6 addresses for one or more of the elements 201-219 and 250-261 on the PPR 220A-B, then the PPR type may include the preset value that corresponds to IPv6 addresses.

In an embodiment, the PPR-PDEs field 427 includes labels, addresses, or identifiers of one or more of the elements 201-219 and 250-261 on the PPR 220A-B being described by the advertisement 400. The PPR-PDEs field 427 includes a sub-field PPR-PDE field 427A-N for each element 201-219 and 250-261 identified as being on the PPR 220A-B. Each PPR-PDE field 427A-N includes a label, address, or ID for one or more of the elements 201-219 and 250-261 on the PPR 220A-B. The label, address, or ID is encoded according to the PPR type indicated by the PPR type field 424. The label, address, or ID included in the PPR-PDE field 427N is for the last node on the PPR 220A-B, and thus may be the same as the address of the destination 280 or may be different than the address of the destination (for example, may be a label, address, or identifier of the egress NE 255).

The attributes field 430 may include additional features that are used to regulate traffic across NEs 250-259 in network 200. In an embodiment, the attributes field 430 carries traffic accounting parameters that is agnostic to protocols (OSPFv2, OSPFv3, ISIS, SDN based direct programming the forwarding). For example, the traffic accounting parameters are further described in the draft document entitled "Traffic Accounting for MPLS Segment Routing Paths," by S. Hedge, dated Oct. 30, 2017.

Continuing with the example described with reference to FIG. 2, the encodings for the two advertisements 400 using strict preferred path routing sent by ingress NE 250 to all other NEs 251-259 may be as follows:

(1) For PPR-ID=2→TYPE:LEN:FLAGS:prefix-len 64: Prefix 2001:fe::xxx: PPR-ID Label: NE 250: NE 253: NE 254: NE 255;

(2) For PPR-ID=3→TYPE:LEN:FLAGS:prefix-len 64: Prefix 2021:fe::xxx: PPR-ID IPv6 Address: NE 250: NE 257: NE 257: NE 258: NE 255.

The advertisement 400 includes information that can be encoded into a control message sent from a central entity 103 to NEs 250-259 in the network 200 or between NEs 250-259 in the network 200. The TLV diagram shown in FIG. 4A may be sent and received in a network implementing an IGP such as IS-IS (as shown below in FIGS. 5A-G) or OSPF (i.e, OSPFv2 or OSPFv3) (as shown below in FIGS. 6A-G and 7A-G). One way to do this is to use a multi-topology aware IGP Binding TLV, a new top level TLV for IS-IS, or a top level TLV of the Extended Prefix LSA in OSPF to advertise the PPR 220A-B. The Extended Prefix LSA is further described in IETF RFC 7684, entitled "OSPFv2 Prefix/Link Attribute Advertisement," by P. Psenak, dated November 2015, and NSPF ID TLV can be part of it.

The advertisement 400 may be included in another message of an existing protocol or may be a new message created for an existing or new protocol. However, it should be appreciated that the advertisements 400 disclosed herein may be encoded in any protocol and can include one or more of the fields shown in FIG. 4A. The advertisement 400 shown in FIG. 4A is used by receiving NEs 251-259 to update the states in local forwarding databases 343 of the NEs 251-259 as necessary.

Figure 4B:
FIG. 4B is a diagram illustrating the PPR information included in the fields of the advertisement shown in FIG. 4A according to various embodiments of the disclosure.

FIG. 4B is a diagram illustrating the PPR information 303 included in the fields of the advertisement 400 shown in FIG. 4A according to various embodiments of the disclosure. As shown in FIG. 4B, the PPR information 303 includes the PPR-ID 333, the PPR-type 443, and one or more PPR-PDEs 366A-N. It should be appreciated that the PPR information 303 shown in FIG. 4B may only be a portion of the information regarding one or more PPRs 220A-B that are transmitted in an advertisement 400.

The PPR-ID 333 is an ID that uniquely identifies a PPR 220A-B. In an embodiment, the PPR-ID 333 is carried in the PPR-ID field 421 of the advertisement 400. The PPR-type 443 defines how the labels, addresses, or IDs of one or more of the elements 201-219 and 250-261 (topological NEs 250-259, non-topological NEs 260-261, or links 201-219) on the PPR 220A-B are encoded in the PPR-PDEs field 427. In an embodiment, the PPR-type 443 is carried in the PPR-type field 424.

The PPR-PDEs 366A-N each include a label, address, or ID representing one or more of the elements 201-219 and 250-261 on the PPR 220A-B being advertised by advertisement 400. In an embodiment, an advertisement 400 may advertise a strict PPR 220A by including PPR-PDEs 366A-N for every single element 201-219 and/or 250-261 (e.g., topological NEs 250-259, non-topological NE 260-261, and/or link 201-219) on an advertised PPR 220A. For example, the first PPR 220A can be advertised as a strict PPR 220A by sending an advertisement 400 including PPR-PDEs 366A-D, in which PPR-PDEs 366A includes an address of NE 250, PPR-PDEs 366B includes an address of NE 253, PPR-PDEs 366C includes an address of NE 254, and PPR-PDEs 366D includes an address of NE 255. In this way, the strict PPR 220A is advertised by including an address of every single NE on the PPR 220A in the advertisement 400. Each of NE 250, NE 253, NE 254, and NE 255 can use the PPR-PDEs 366A-D to identify a next NE toward which to forward the data packet.

In an embodiment, an advertisement 400 may advertise a loose PPR 220B by including PPR-PDEs 366A-N for a subset of the elements 201-219 and 250-261 on an advertised PPR 220B. For example, the second PPR 220B can be advertised as a loose PPR 220B by sending an advertisement 400 including PPR-PDEs 366A-D, in which PPR-PDEs 366A includes an address of NE 250, PPR-PDEs 366B includes an address of NE 256, PPR-PDEs 366C includes an address of NE 258, and PPR-PDEs 366D includes an address of NE 255. In this way, the loose PPR 220B includes an address of only a subset of the NEs on the PPR 220B because the advertisement 400 excludes an address of NE 257. In this case, NE 257 may use many different routes to send a packet having the PPR-ID 333 of 3 to NE 258. For example, NE 256 may forward a data packet to NE 258 via NE 257 or via NEs 257 and 259. In this case, since the PPR 220B is advertised as a loose PPR 220B that does not specify the exact route by which to transmit the data packet between NE 256 and NE 258, NE 256 may resort to transmitting the data packet via the shortest path between NE 256 and NE 258.

Figure 4C:
FIG. 4C is a diagram illustrating a data packet including PPR information that should be forwarded according to a PPR according to various embodiments of the disclosure.

FIG. 4C is a diagram illustrating a data packet 450 including PPR information 303 that should be forwarded according to a PPR 220A-B according to various embodiments of the disclosure. As shown in FIG. 4C, the data packet 450 may include a PPR-ID 333, a source address 446, a prefix or destination address 445, and a payload 449. It should be appreciated that FIG. 4C only shows a portion of the data packet 450. Therefore, the data packet 450 may include additional fields and information, such as an inner label or virtual private network label, which is not shown by FIG. 4C.

In an embodiment in which the data packet 450 is transmitted in an MPLS network, the data packet 450 may include two labels. The bottom label, as described above, includes the PPR-ID 333 identifying the PPR 220A-B by which to transmit the data packet 450. In an embodiment, the top label also described above with reference to FIG. 2, includes a shortest path label or SID of the next element 201-219 and 250-261 on the PPR 220A-B.

As shown by FIG. 4C, the data packet 450 includes the PPR-ID 333 identifying the PPR 220A-B over which to transmit the data packet 450. The source address 446 may include a label, address, or identifier of a source 270 from which the data packet 450 is received. The prefix or destination address 445 includes the prefix or destination address 445 of the destination 280 or the egress NE 255 toward which to transmit the data packet 450. The payload 449 includes the user data carried by the data packet 450.

In an embodiment, when an NE 250-259 receives the data packet 450, the NE 250-259 may use the PPR-ID 333 and/or the prefix or destination address 445 to search the forwarding database 343. In an embodiment, a lookup is performed on the forwarding database 343 using the PPR-ID 333 and/or the prefix or destination address 445 to obtain a next element 201-219 and 250-261 (e.g., topological NE 250-259, non-topological NE 260-261, or link 201-219) toward which to transmit the data packet 450.

FIGS. 5A-G, FIGS. 6A-G, and FIGS. 7A-G are diagrams illustrating examples of the advertisement 400 and fields within the advertisement 400 according to various different protocols. Specifically, FIGS. 5A-G are diagrams illustrating examples of the advertisement 400 and fields within the advertisement 400 according to IS-IS, FIGS. 6A-G are diagrams illustrating examples of the advertisement 400 and fields within the advertisement 400 according to OSPFv2, and FIGS. 7A-G are diagrams illustrating examples of the advertisement 400 and fields within the advertisement 400 according to OSPFv3.

FIGS. 5A-G are diagrams illustrating examples of the advertisement 500 and fields within the advertisement 500 according to IS-IS. While some aspects of advertisement 500 according to IS-IS are described below with reference to FIGS. 5A-G, advertisement 500 is further defined in the link state routing (LSR) Working Group Draft Document entitled "Preferred Path Routing (PPR) in IS-IS," dated Jul. 2, 2018, by U. Chunduri, et. al. (hereinafter referred to as the "PPR IS-IS Document").

Figure 5A:
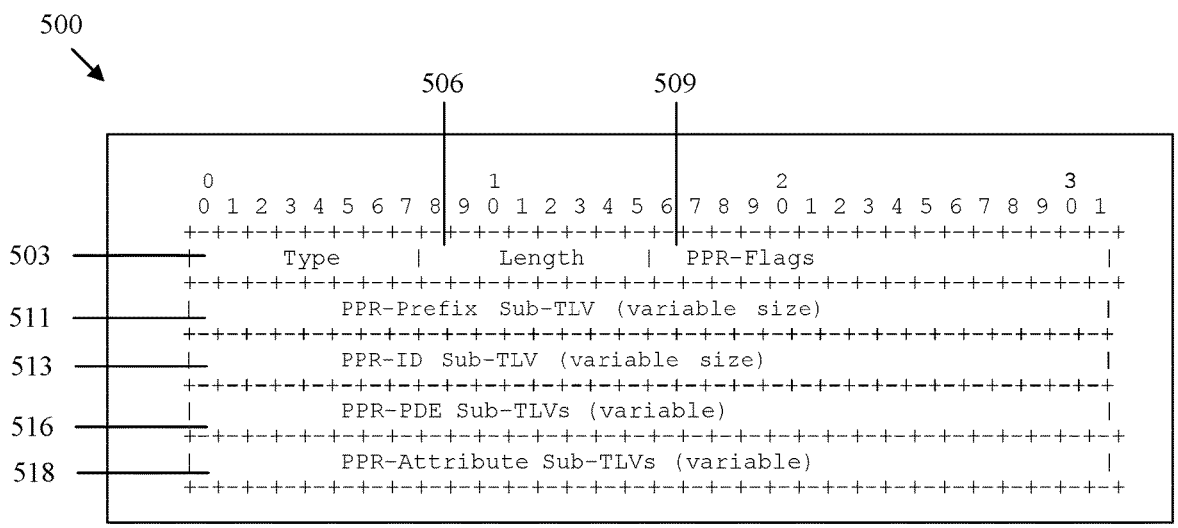

FIG. 5A is a PPR TLV of an advertisement 500 similar to advertisement 400, except that advertisement 500 is encoded according to IS-IS. In an embodiment, advertisement 500 may be included in an existing advertisement message of IS-IS. In an embodiment, advertisement 500 may be a new message created for IS-IS. Suppose that network 200 implements IS-IS, then the ingress NE 250 may send the advertisement 500 to NEs 251-259 in the network 200.

As shown in FIG. 5A, advertisement 500 includes a type field 503, a length field 506, a PPR flags field 509, a PPR-Prefix sub-TLV 511, a PPR-ID sub-TLV 513, a PPR-PDE sub-TLV 516, and a PPR-Attribute sub-TLV 518. The type field 503 is similar to the type field 403 (see FIG. 4A) of advertisement 400 (see FIG. 4A) and may carry a value assigned by the Internet Assigned Numbers Authority (IANA). The length field 506 field is similar to the length field 406 (see FIG. 4A) of advertisement 400 in that the length field 506 includes the total length of the value field in bytes.

The PPR flags field 509 is similar to the flags field 409 (see FIG. 4A). The PPR flags field 509 is a variable size sub-TLV representing the destination 280 of the PPR 220A-B being described and is further described below with reference to FIG. 5B. The PPR-Prefix sub-TLV 511 is a variable size sub-TLV describing the prefix or destination address 445 of the destination 280 of the PPR 220A-B and is further described below with reference to FIG. 5C. The PPR-ID sub-TLV 513 is a variable size sub-TLV defining PPR-ID 333 of the PPR 220A-B and is further described below with reference to FIG. 5D. The PPR-PDE sub-TLV 516 includes a variable number of ordered PDE sub-TLVs 366A-N representing the PPR 220A-B and is further described below with reference to FIG. 5F.

The PPR-Attribute sub-TLV 518 is similar to the attributes field 430 (see FIG. 4A) in that the PPR-Attribute sub-TLV 518 represents attributes of the PPR 220A-B. The PPR-Attribute sub-TLV 518 may include a variable number of PPR-Attribute sub-TLVs depending on the number of attributes being defined for the PPR 220A-B being advertised.

Figure 5B:
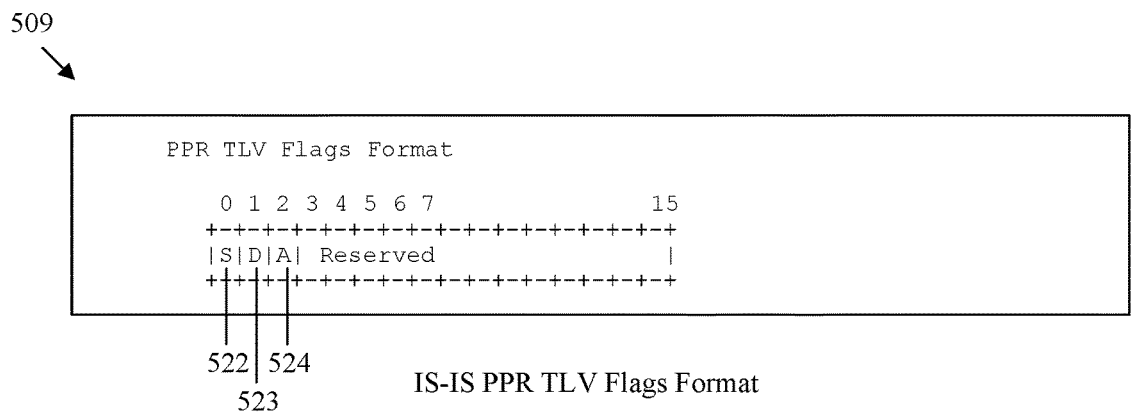

FIG. 5B is a diagram illustrating the PPR flags field 509 of the advertisement 500. The PPR flags field 509 may include three different flags 522, 523, and 524. The S flag 522, labelled as "S" in FIG. 5B, indicates that, if set, the advertisement 500 including the PPR TLV is flooded across the entire routing domain (e.g., network 200). If the S flag 522 is not set, then the advertisement 500 including the PPR TLV is not be leaked between IS-IS levels.

The D flag 523, labelled as "D" in FIG. 5B, indicates that when the advertisement 500 including the PPR TLV is leaked from IS-IS level-2 to level-1, the D bit 523 may be set. Otherwise, the D bit may be clear. The advertisement 500 including the PPR TLV with the D bit 523 may not be permitted to be leaked from level-1 to level-2.

The A-flag 524, labelled as "A" in FIG. 5B, indicates that the prefixes and PPR-IDs 333 advertised in the advertisement 500 including the PPR TLV are directly connected to the originators of the advertisement 500. If the A-flag 524 is not set, any other NE in the network may advertise the advertisement 500 on behalf of the originating node of the advertisement 500. As shown by FIG. 5B, the PPR flags field 509 includes reserved bits that are reserved for future use, should be set to 0, and ignored upon reception.

FIG. 5C is a diagram illustrating the PPR-Prefix sub-TLV 511, which is a variable size sub-TLV describing the prefix or destination address of the destination 280 of the PPR 220A-B. The PPR-Prefix sub-TLV 511 includes a type field 525, a length field 526, an MT-ID field 527, a prefix length field 528, a mask length field 529, and an IS-IS prefix field 530. The type field 525 may include a value assigned by the IANA indicating a type of the PPR-Prefix sub-TLV 511. The length field 526 includes a total length of the value field in bytes. The MT-ID field 527 is similar to the MT-ID field 415 including a multi-topology identifier, in which the four most significant bits are set to 0 on transmit and ignored upon reception. The remaining 12 bit field carries the multi-topology identifier.

The prefix length field 528 includes the length of the prefix or destination address 445 of the destination 280 (or egress NE 255) in bytes. The mask length field 529 includes a length of the prefix in bits, in which only the most significant octets of the prefix are encoded. The IS-IS prefix field 530 includes the IS-IS prefix or destination address 445, which may refer to the tail-end egress NE 255 of the PPR 220A-B or the destination 280 of the PPR 220A-B. The value of the IS-IS prefix field 530 is 4 octets when the prefix is an IPv4 address and 16 octets when the prefix is an IPv6 address.

FIG. 5D is a diagram illustrating the PPR-ID sub-TLV 513, which is a variable size sub-TLV defining PPR-ID 333 of the PPR 220A-B. The PPR-ID sub-TLV 513 includes a type field 533, a length field 534, a PPR-ID flags field 535, a PPR-ID type field 536, a PPR-ID length field 537, a PPR-ID mask length field 538 (shown in FIG. 5D as "PPR-ID Mask Len"), an algorithm field 539 (shown in FIG. 5D as "Algo"), and a PPR-ID field 540. The type field 533 includes a value assigned by the IANA indicating a type of the PPR-ID sub-TLV 513. The length field 534 includes a total length of the value field in bytes. The PPR-ID flags field 535 is a 2 octet field for flags, which will be further described below with reference to FIG. 5E.

The PPR-ID type field 536 includes a value indicating a data plane type of the PPR-ID 333 being advertised. For example, a value of 1 may indicate a data plane type of MPLS/SID Label, a value of 2 may indicate a data plane type of native IPv4 addresses or prefixes, a value of 3 may indicate a data plane type of native IPv6 addresses or prefixes, and a value of 4 may indicate a data plane type of IPv6 SID in SRv6 with SRHs. The PPR-ID length field 573 includes a length of the PPR-ID field 540 in octets and may depend on the PPR-ID type 443 included in the PPR-ID type field 536. The PPR-ID mask length field 538 may only be applicable for certain PPR-ID types 443, such as types 2, 3, and 4 listed above, and may include the length of the PPR-ID 333 in bits. The algorithm field 539 is a 1 octet value representing the SPF algorithm used to calculate the predetermined shortest path 221 between the source 270 and the destination 280.

The PPR-ID field 540 includes the PPR-ID 333 of the advertised PPR 220A-B. The value of the PPR-ID 333 is variable and depends on the PPR-ID type 443. When the PPR type 443 is an MPLS SID/Label, then the PPR-ID 333 is also an MPLS SID/Label. When the PPR type 443 is native IPv4, then the PPR-ID 333 is a 4 byte IPv4 address. When the PPR type 443 is native IPv4, then the PPR-ID 333 is a 16 byte IPv6 address. When PPR type 443 is IPv6 SID in SRv6, then the PPR-ID 333 is an IPv6 SID.

FIG. 5E is a diagram illustrating the PPR-ID flags field 535 of the advertisement 500. The PPR-ID flags field 535 may include two different flags 542 and 543. The L flag 542, labelled as "L" in FIG. 5E, indicates that, if set, then the PPR 220A-B being advertised includes a loose-PPR 220A-B in which only a subset of the elements 201-219 and 250-261 of the PPR 220A-B is identified in the advertisement 500. If the L flag 542 is not set, then the PPR 220A-B being advertised is a strict-PPR 220A-B in which all of the topological NEs 250-259 of the PPR 220A-B are identified in the advertisement 500. In an embodiment, a strict-PPR 220A-B lists every single node or adjacency in the path description from source 270 to destination 280. In an embodiment, a strict-PPR 220A-B lists every single link in the path description from source 270 to destination 280.

The A flag 543, labelled as "A" in FIG. 5E, indicates that, if set, all non-PPR nodes in the IS-IS area/domain (network 200) may add a forwarding information database (FIB) (also referred to herein as the "forwarding database") entry for the PPR-ID 333 with the next element set to the shortest path next element 201-219 and 250-261 for the prefix 445 being advertised. The next element may refer to the next segment, next hop, next link, next label, next function, next context, etc., on the PPR 220A-B. As shown by FIG. 5E, the PPR PPR-ID flags field 535 includes reserved bits that are reserved for future use, should be set to 0, and ignored upon reception.

Figure 5F:
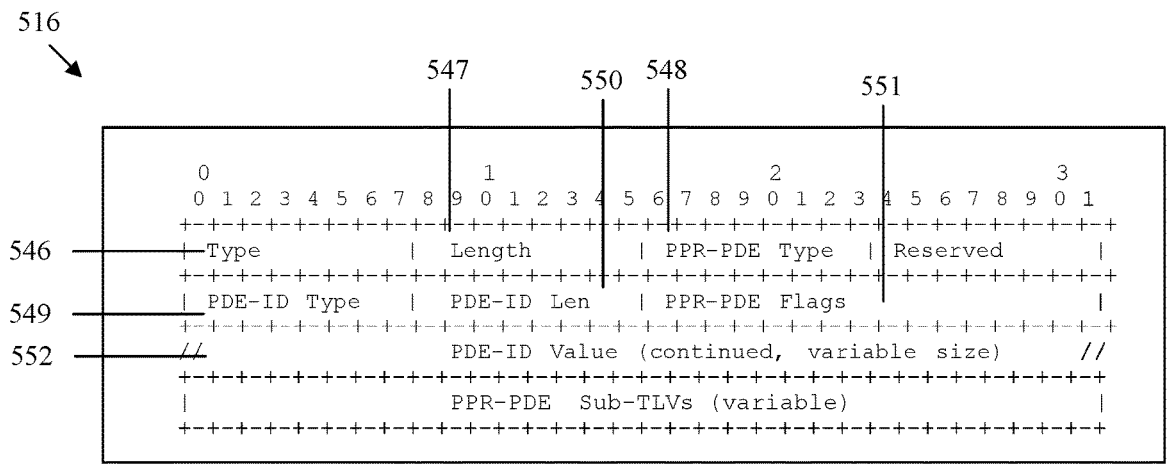

FIG. 5F is a diagram illustrating the PPR-PDE sub-TLV 516 of the advertisement 500. In an embodiment, each of the PPR-PDEs 427A-N (see FIG. 4) of advertisement 400 may include the PPR-PDE sub-TLV 516 for each element on the PPR 220A-B being advertised. The PPR-PDE sub-TLV 516 includes a type field 546, a length field 547, a PPR-PDE type field 548, a PDE-ID type field 549, a PDE-ID length field 550, a PPR-PDE flags field 551, and a PDE-ID value field 552. The type field 546 may include a value assigned by the IANA indicating a type of the PPR-Prefix sub-TLV 511. The length field 547 includes a total length of the value field in bytes.

The PPR-PDE type field 548 includes a value representing a type of the element 201-219 and 250-261 being identified in the PPR-PDE sub-TLV 516 (e.g., whether the element 201-219 and 250-261 is a topological NE (NE 250-259 or link 201-219) or a non-topological NE 260-261). For example, the value of 1 may indicate that the element 201-219 and 250-261 being identified in the PPR-PDE sub-TLV 516 is a topological NE 250-259 (or link 201-219), and the value of 2 may indicate that the element 201-219 and 250-261 being identified in the PPR-PDE sub-TLV 516 is a non-topological NE 260-261.

The PDE-ID type field 549 may be an octet including a value indicating a PDE-forwarding ID type. For example, the value of 1 may indicate that the PDE-forwarding ID type is an SID/label, the value of 2 may indicate that the PDE-forwarding ID type is an SR-MPLS prefix SID, the value of 3 may indicate that the PDE-forwarding ID type is an SR-MPLS adjacency SID, a value of 4 may indicate that the PDE-forwarding type is an IPv4 address, a value of 5 may indicate that the PDE-forwarding type is an IPv6 address, a value of 6 may indicate that the PDE-forwarding type is an SRv6 node SID, and a value of 7 may indicate that the PDE-forwarding type is an SRv6 adjacency SID. The PDE-ID length field 550 may include a length of the PDE-forwarding ID type included in the PDE-ID type field 549.

The PPR-PDE flags field 551 is a 2 octet bit field of flags, which is further described below with reference to FIG. 5G. The PDE-ID value field 552 includes a label, address, or ID of the element 201-219 and 250-261 (topological NE 250-259, non-topological NE 260-261, and/or link 201-219) being identified in the PPR-PDE sub-TLV 516 and is encoded based on the PDE-forwarding ID type included in the PDE-ID type field 549.

Figure 5G:
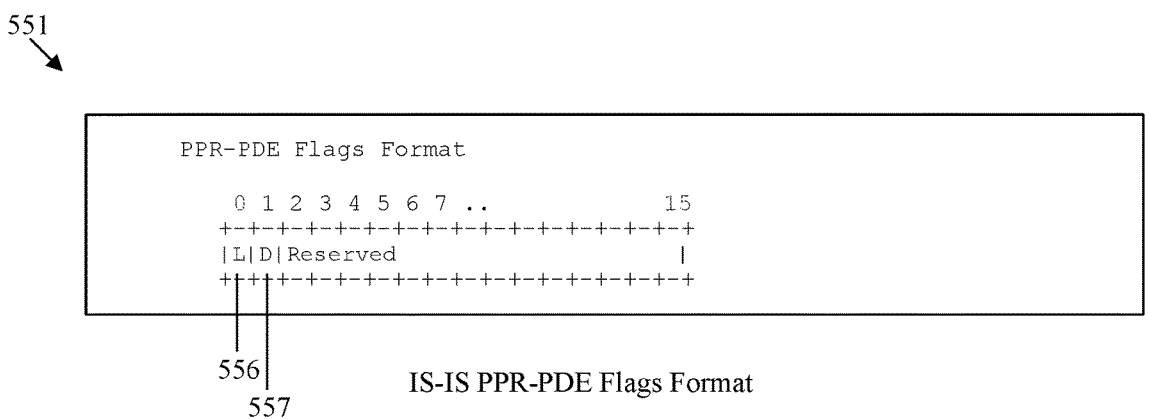

FIG. 5G is a diagram illustrating the PPR-PDE flags field 551 of the advertisement 500. The PPR-PDE flags field 551 may include two different flags 556 and 557. The L flag 556, labelled as "L" in FIG. 5G, indicates the type of the next topological PDE-ID in the PPD-PDEs listed in the PPR-PDE sub-TLV 516. In an embodiment, if the L flag 556 is set, then the next topological NE 250-259 corresponding to the next topological PDE-ID is loose (may not be the direct next element attached to the current NE on the PPR advertised). In this embodiment, if the L flag 556 is not set, then the next topological NE 250-259 corresponding to the next topological PDE-ID is strict (may be the direct next element attached to the current NE on the PPR advertised).

The D flag 557, labelled as "D" in FIG. 5G, is by default unset, unless the PPR-PDE type is 1 (indicating that the next element is a topological element). As shown by FIG. 5G, the PPR-PDE flags field 551 includes reserved bits that are reserved for future use, should be set to 0, and ignored upon reception.

FIGS. 6A-G are diagrams illustrating examples of the advertisement 600 and fields within the advertisement 600 according to OSPFv2. While some aspects of advertisement 600 according to OSPFv2 is described below with reference to FIGS. 6A-G, advertisement 600 is further defined in the LSR Working Group Draft Document entitled "Preferred Path Routing (PPR) in OSPF," dated Jul. 2, 2018, by U. Chunduri, et. al. (hereinafter referred to as the "PPR OSPF Document.

Figure 6A:
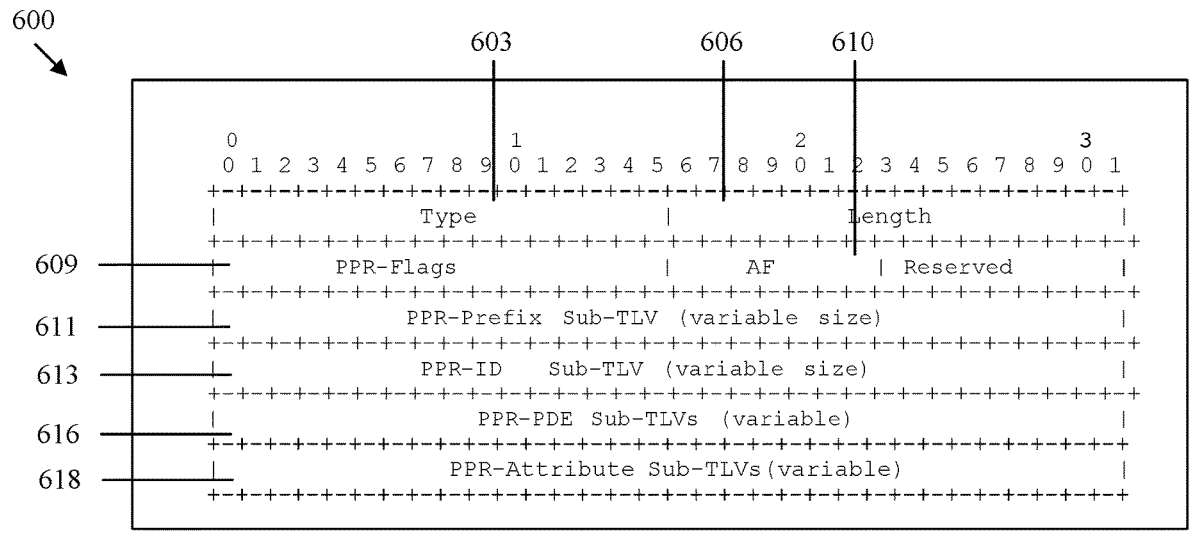

FIG. 6A is an OSPF PPR TLV of an advertisement 600 similar to advertisement 500 (see FIG. 5A-G), except that advertisement 600 is encoded according to OSPFv2. In an embodiment, advertisement 600 may be included in an existing advertisement message of OSPFv2. In an embodiment, advertisement 600 may be a new message created for OSPFv2. Suppose that network 200 implements OSPFv2, then the ingress NE 255 may send the advertisement 600 to NEs 251-259 in the network 200.

As shown in FIG. 6A, advertisement 600 includes fields similar to the advertisement 500. The type field 603 may be similar to the type field 503 of advertisement 500 and the length field 606 may be similar to the length field 506 of advertisement 500. Advertisement 600 further includes a PPR flags field 609, which may be different from the PPR flags field 509 (see FIG. 5B), and is further described below with reference to FIG. 6B.

Advertisement 600 differs from advertisement 500 in that the advertisement 600 additionally includes an address family (AF) field 610 and some reserved bits. The AF field 610 includes a value indicating an address family for the prefix or destination address 445 (see FIG. 4) being advertised by the advertisement 600.

The advertisement 600 also includes a PPR-Prefix sub-TLV 611, a PPR-ID sub-TLV 613, a PPR-PDE sub-TLV 616, and a PPR-Attribute sub-TLV 618. Similar to the PPR-Prefix sub-TLV 511 (see FIG. 5), the PPR-Prefix sub-TLV 611 is a variable size sub-TLV describing the prefix or destination address 445 of the destination 280 of the PPR 220A-B and is further described below with reference to FIG. 6C. Similar to the PPR-ID sub-TLV 513 (see FIG. 5), the PPR-ID sub-TLV 613 is a variable size sub-TLV defining PPR-ID 333 of the PPR 220A-B and is further described below with reference to FIG. 6D. Similar to the PPR-PDE sub-TLV 516 (see FIG. 5), PPR-PDE sub-TLV 616 includes a variable number of ordered PDE sub-TLVs representing the PPR 220A-B and is further described below with reference to FIG. 6F.

The PPR-Attribute sub-TLV 618 is a similar to the PPR-Attribute sub-TLV 518 (see FIG. 5) and attributes field 430 (see FIG. 4) in that the PPR-Attribute sub-TLV 618 represents attributes of the PPR 220A-B. The PPR-Attribute sub-TLV 618 may include a variable number of PPR-Attribute sub-TLVs depending on the number of attributes being defined for the PPR 220A-B being advertised.

Figure 6B:
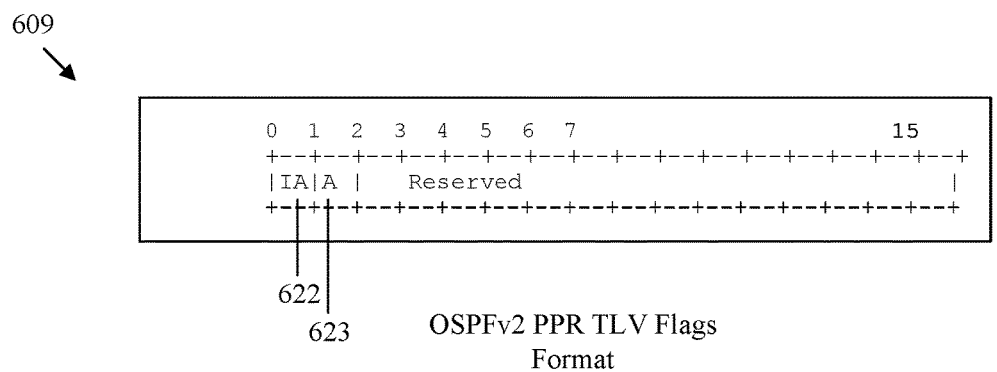

FIG. 6B is a diagram illustrating the PPR flags field 609 of the advertisement 600. The PPR flags field 609 may include two different flags 622 and 623. The IA flag 622, labelled as "IA" in FIG. 6B, indicates that, if set, the advertisement 600 is of an inter-area type. In an embodiment, the ingress NE 255 may be an area border router. In such an embodiment, the ingress NE 255 forwarding the advertisement 600 including the OSPF PPR TLV may set this IA flag 622.

The A flag 623, labelled as "A" in FIG. 6B, indicates that the prefixes and PPR-IDs 333 advertised are directly connected to the originators of the advertisement 600. If the A-flag 623 is not set, any other NE in the network may advertise the advertisement 600 on behalf of the originating node of the advertisement 600. As shown by FIG. 6B, the PPR flags field 609 includes reserved bits that are reserved for future use, should be set to 0, and ignored upon reception.

FIG. 6C is a diagram illustrating the PPR-Prefix sub-TLV 611, which is similar to the PPR-Prefix sub-TLV 511 (see FIG. 5). The PPR-Prefix sub-TLV 611 includes a type field 625, a length field 626, an MT-ID field 627, a prefix length field 628, and a mask length field 629, which may be similar to the type field 525 (see FIG. 5), length field 526 (see FIG. 5), MT-ID field 527 (see FIG. 5), prefix length field 528 (see FIG. 5), and mask length field 529 (see FIG. 5) of PPR-Prefix sub-TLV 511 (see FIG. 5), respectively. As shown in FIG. 6C the lengths of the fields of the PPR-Prefix sub-TLV 611 may differ from the lengths of the fields of the PPR-Prefix sub-TLV 511.

The PPR-Prefix sub-TLV 611 differs from the PPR-Prefix sub-TLV 511 in that the PPR-Prefix sub-TLV 611 includes an OSPFv2 prefix field 630 instead of an IS-IS prefix field 530 (see FIG. 5). The OSPFv2 prefix field 630 includes the OSPFv2 prefix or destination address, which may refer to the tail-end egress NE 255 of the PPR 220A-B or the destination 280 of the PPR 220A-B. The value of the OSPFv2 prefix field 630 may be encoded as a 32 bit value when the AF represents an IPv4 unicast AF.

FIG. 6D is a diagram illustrating the PPR-ID sub-TLV 613, which is similar to the PPR-ID sub-TLV 513 (see FIG. 5). The PPR-ID sub-TLV 613 includes a type field 633, a length field 634, a PPR-ID flags field 635, a PPR-ID type field 636, a PPR-ID length field 637, a PPR-ID mask length field 638 (shown in FIG. 6D as "PPR-ID Mask Len"), an algorithm field 639 (shown in FIG. 6D as "Algo"), and a PPR-ID field 640, which may be similar to the type field 533 (see FIG. 5), length field 534 (see FIG. 5), PPR-ID flags field 535 (see FIG. 5), PPR-ID type field 536 (see FIG. 5), PPR-ID length field 537 (see FIG. 5), PPR-ID mask length field 538 (see FIG. 5), algorithm field 539 (see FIG. 5), and PPR-ID field 540 (see FIG. 5) of PPR-ID sub-TLV 513 (see FIG. 5), respectively. As shown in FIG. 6D, the lengths of the fields of the PPR-ID sub-TLV 613 may differ from the lengths of the fields of the PPR-ID sub-TLV 513.

FIG. 6E is a diagram illustrating the PPR-ID flags field 635 of the advertisement 600, which may be similar to the PPR-ID flags field 535 of the advertisement 500. The PPR-ID flags field 635 includes the L flag 642, which may be similar to the L flag 542 (see FIG. 5), and the A flag 643, which may be similar to the A flag 543 (see FIG. 5). As shown by FIG. 6E, the PPR-ID flags field 635 includes reserved bits that are reserved for future use, should be set to 0, and ignored upon reception.

Figure 6F:
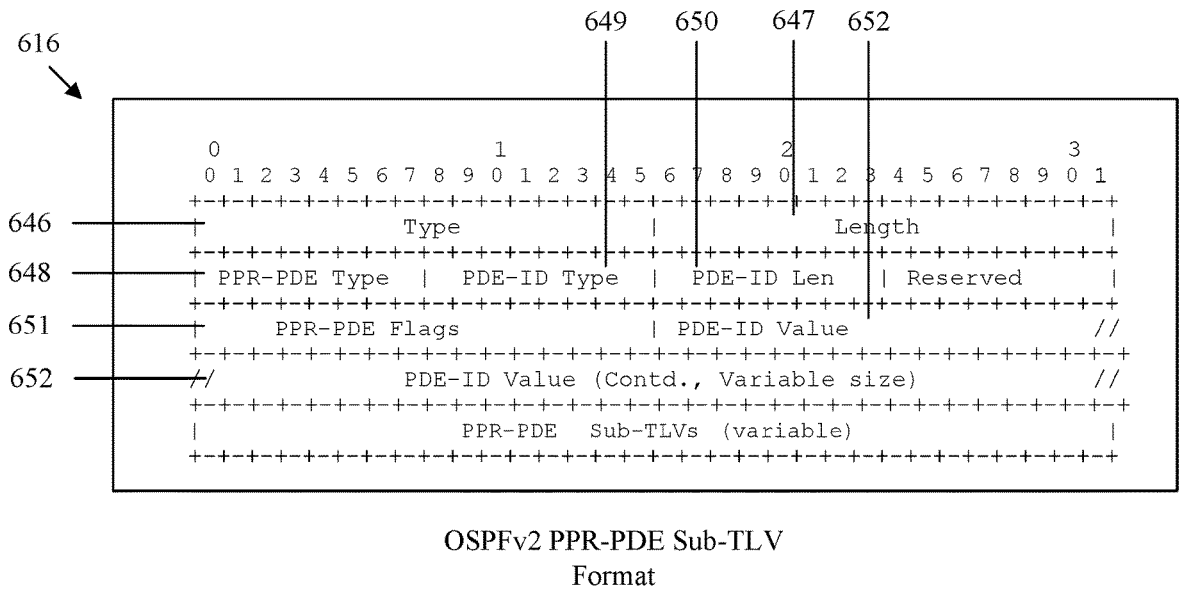

FIG. 6F is a diagram illustrating the PPR-PDE sub-TLV 616 of the advertisement 600, which is similar to the PPR-PDE sub-TLV 516 (see FIG. 5) of advertisement 500. In an embodiment, each of the PPR-PDE 427A-N (see FIG. 4) of advertisement 400 may include the PPR-PDE sub-TLV 616 for each element 201-219 and 250-261 on the PPR 220A-B being advertised. The PPR-PDE sub-TLV 616 includes a type field 646, a length field 647, a PPR-PDE type field 648, a PDE-ID type field 649, a PDE-ID length field 650, a PPR-PDE flags field 651, and a PDE-ID value field 652, which may be similar to the type field 546 (see FIG. 5), length field 547 (see FIG. 5), PPR-PDE type field 548 (see FIG. 5), PDE-ID type field 549 (see FIG. 5), PDE-ID length field 650 (see FIG. 5), PPR-PDE flags field 551 (see FIG. 5), and PDE-ID value field 552 (see FIG. 5) of PPR-PDE sub-TLV 516 (see FIG. 5), respectively. As shown in FIG. 6F, the lengths of the fields of the PPR-PDE sub-TLV 616 may differ from the lengths of the fields of the PPR-PDE sub-TLV 516.

Figure 6G:
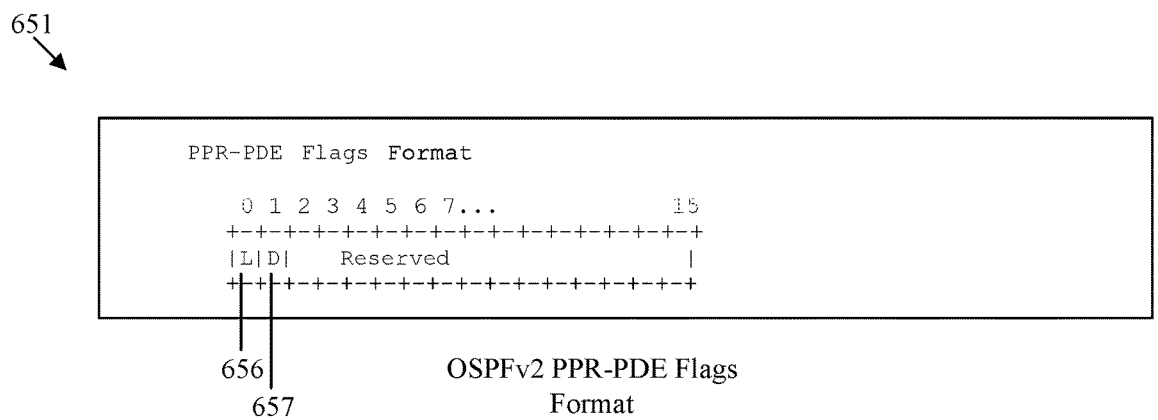

FIG. 6G is a diagram illustrating the PPR-PDE flags field 651 of the advertisement 600, which may be similar to the PPR-PDE flags field 551 (see FIG. 5) of the advertisement 500. The PPR-PDE flags field 651 may include the L flag 656, which may be similar to the L flag 556 (see FIG. 5), and the D flag 657, which may be similar to the D flag 557 (see FIG. 5). As shown by FIG. 6G, the PPR-PDE flags field 651 includes reserved bits that are reserved for future use, should be set to 0, and ignored upon reception.

FIGS. 7A-G are diagrams illustrating examples of the advertisement 700 and fields within the advertisement 700 according to OSPFv3. While some aspects of advertisement 700 OSPFv3 is described below with reference to FIGS. 7A-G, advertisement 700 is further defined in the PPR OSPF Document referenced above.

Figure 7A:
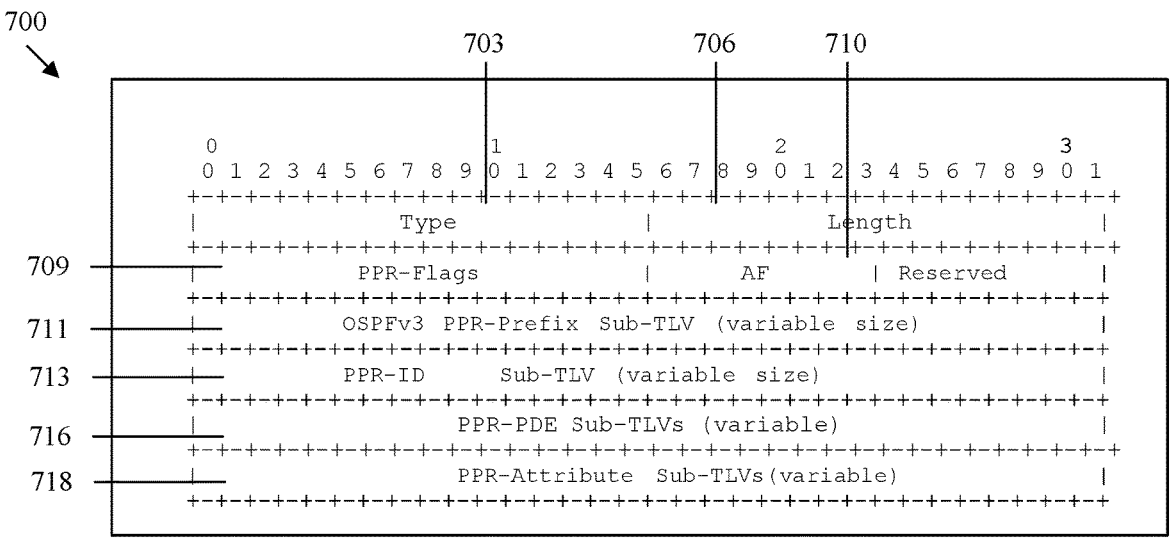

FIG. 7A is an OSPF PPR TLV of an advertisement 700 similar to advertisement 600 (see FIG. 6), except that advertisement 700 is encoded according to OSPFv3 instead of OSPFv2. Similar to advertisement 600, advertisement 700 includes a type field 703, a length field 706, a PPR flags field 709, an AF field 710, a PPR-Prefix sub-TLV 711, a PPR-ID sub-TLV 713, a PPR-PDE sub-TLV 716, and a PPR-Attribute sub-TLV 718. The type field 703, length field 706, PPR flags field 709, AF field 710, PPR-Prefix sub-TLV 711, PPR-ID sub-TLV 713, PPR-PDE sub-TLV 716, and PPR-Attribute sub-TLV 718 may be similar to the type field 603 (see FIG. 6), length field 606 (see FIG. 6), PPR flags field 609 (see FIG. 6), AF field 610 (see FIG. 6), PPR-Prefix sub-TLV 611 (see FIG. 6), PPR-ID sub-TLV 613 (see FIG. 6), PPR-PDE sub-TLV 616 (see FIG. 6), and PPR-Attribute sub-TLV 618 (see FIG. 6) of advertisement 600, respectively.

Figure 7B:
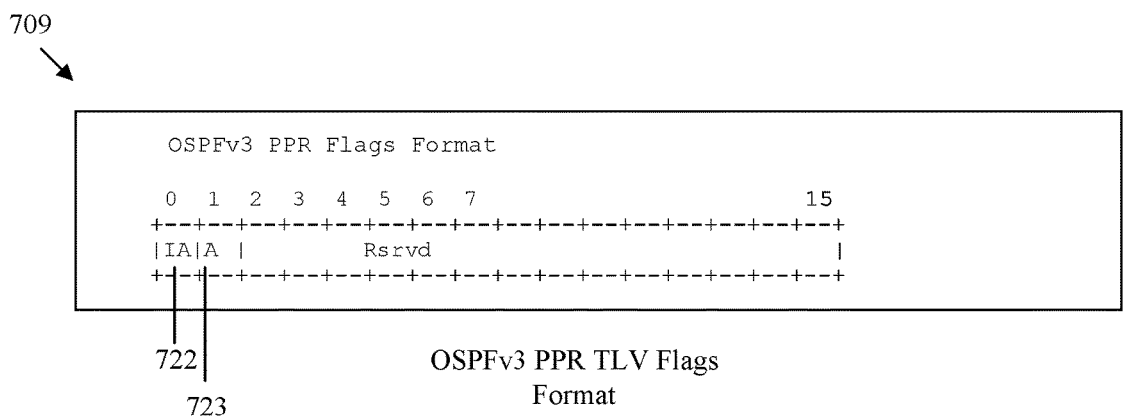

FIG. 7B is a diagram illustrating the PPR flags field 709 of advertisement 700, which is similar to the PPR flags field 609 of advertisement 600. Advertisement 700 includes the IA flag 722, which is similar to the IA flag 622 (see FIG. 6) of PPR flags field 609, and an A flag 723, which is similar to the A flag 623 (see FIG. 6) of PPR flags field 609. As shown by FIG. 7B, the PPR flags field 709 includes reserved bits that are reserved for future use, should be set to 0, and ignored upon reception.

FIG. 7C is a diagram illustrating the PPR-Prefix sub-TLV 711, which is similar to the PPR-Prefix sub-TLV 611. The PPR-Prefix sub-TLV 711 includes a type field 725, a length field 726, a prefix length field 728, and a mask length field 729, which may be similar to the type field 625 (see FIG. 6), length field 626 (see FIG. 6), prefix length field 628 (see FIG. 6), and mask length field 629 (see FIG. 6) of advertisement 600, respectively. However, the PPR-Prefix sub-TLV 711 does not include a field for the multi-topological identifier, as included in PPR-Prefix sub-TLV 611. As shown in FIG. 7C the lengths of the fields of the PPR-Prefix sub-TLV 611 may differ from the lengths of the fields of the PPR-Prefix sub-TLV 511.

The PPR-Prefix sub-TLV 711 differs from the PPR-Prefix sub-TLV 711 in that the PPR-Prefix sub-TLV 711 includes an OSPFv3 prefix field 730 instead of an OSPFv2 prefix field 630 (see FIG. 6). The OSPFv3 prefix field 730 includes the OSPFv3 prefix or destination address 445, which may refer to the tail-end egress NE 255 of the PPR 220A-B or the destination 280 of the PPR 220A-B. The value of the OSPFv3 prefix field 730 may be encoded as a 32 bit value when the AF represents an IPv4 unicast AF.

FIG. 7D is a diagram illustrating the PPR-ID sub-TLV 713, which is similar to the PPR-ID sub-TLV 613. The PPR-ID sub-TLV 713 includes a type field 733, a length field 734, a PPR-ID flags field 735, a PPR-ID type field 736, a PPR-ID length field 737, a PPR-ID mask length field 738 (shown in FIG. 6D as "PPR-ID Mask Len"), an algorithm field 739 (shown in FIG. 6D as "Algo"), and a PPR-ID field 740, which may be similar to the type field 633 (see FIG. 6), length field 634 (see FIG. 6), PPR-ID flags field 635 (see FIG. 6), PPR-ID type field 636 (see FIG. 6), PPR-ID length field 637 (see FIG. 6), PPR-ID mask length field 638 (see FIG. 6), algorithm field 639 (see FIG. 6), and PPR-ID field 640 (see FIG. 6) of PPR-ID sub-TLV 613, respectively. As shown in FIG. 7D, the lengths of the fields of the PPR-ID sub-TLV 713 may differ from the lengths of the fields of the PPR-ID sub-TLV 613.

FIG. 7E is a diagram illustrating the PPR-ID flags field 735 of the advertisement 700, which may be similar to the PPR-ID flags field 535 (see FIG. 5) of the advertisement 500. The PPR-ID flags field 635 includes the L flag 742, which may be similar to the L flag 542 (see FIG. 5), and the A flag 743, which may be similar to the A flag 543 (see FIG. 5). As shown by FIG. 7E, the PPR-ID flags field 735 includes reserved bits that are reserved for future use, should be set to 0, and ignored upon reception.

Figure 7F:
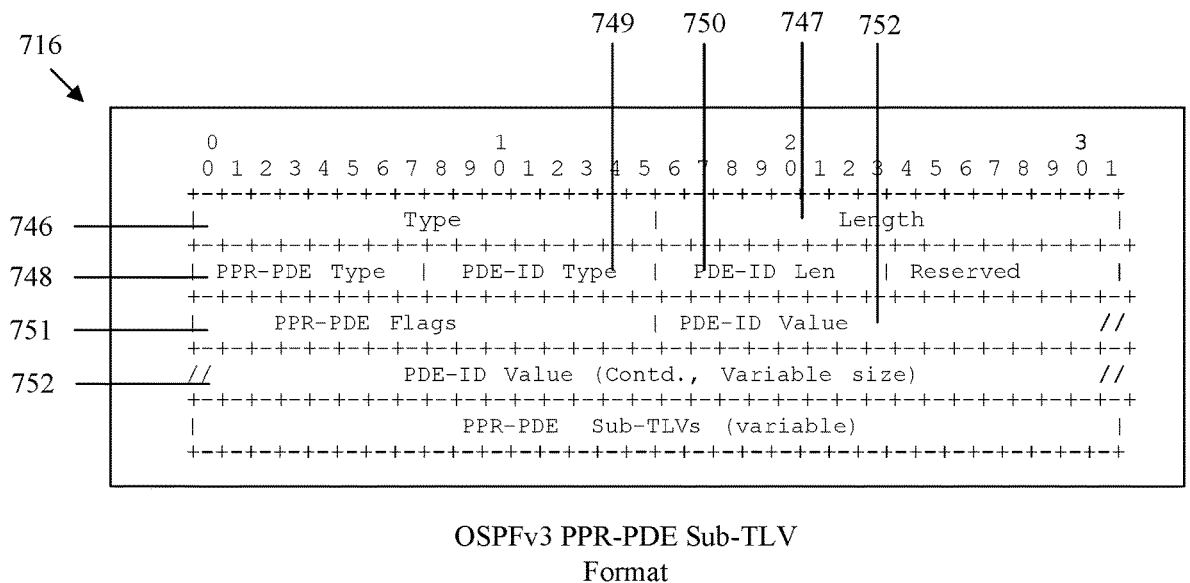

FIG. 7F is a diagram illustrating the PPR-PDE sub-TLV 716 of the advertisement 700, which is similar to the PPR-PDE sub-TLV 616 of advertisement 600. In an embodiment, each of the PPR-PDE 427A-N (see FIG. 4) of advertisement 400 may include the PPR-PDE sub-TLV 716 for each element 201-219 and 250-261 on the PPR 220A-B being advertised. The PPR-PDE sub-TLV 716 includes a type field 746, a length field 747, a PPR-PDE type field 748, a PDE-ID type field 749, a PDE-ID length field 750, a PPR-PDE flags field 751, and a PDE-ID value field 752, which may be similar to the type field 646 (see FIG. 6), length field 647 (see FIG. 6), PPR-PDE type field 648 (see FIG. 6), PDE-ID type field 649 (see FIG. 6), PDE-ID length field 650 (see FIG. 6), PPR-PDE flags field 651 (see FIG. 6), and PDE-ID value field 652 (see FIG. 6) of PPR-PDE sub-TLV 616, respectively. As shown in FIG. 7F, the lengths of the fields of the PPR-PDE sub-TLV 716 may differ from the lengths of the fields of the PPR-PDE sub-TLV 616.

Figure 7G:
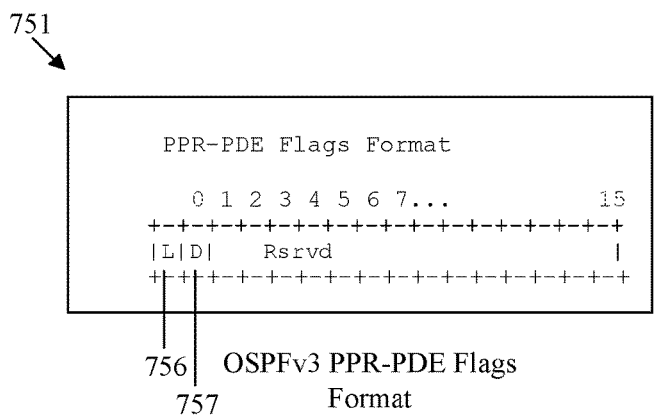

FIG. 7G is a diagram illustrating the PPR-PDE flags field 751 of the advertisement 700, which may be similar to the PPR-PDE flags field 551 (see FIG. 5) of the advertisement 500. The PPR-PDE flags field 751 may include the L flag 756, which may be similar to the L flag 556 (see FIG. 5), and the D flag 757, which may be similar to the D flag 557 (see FIG. 5). As shown by FIG. 7E, the PPR-PDE flags field 751 includes reserved bits that are reserved for future use, should be set to 0, and ignored upon reception.

Figure 8:
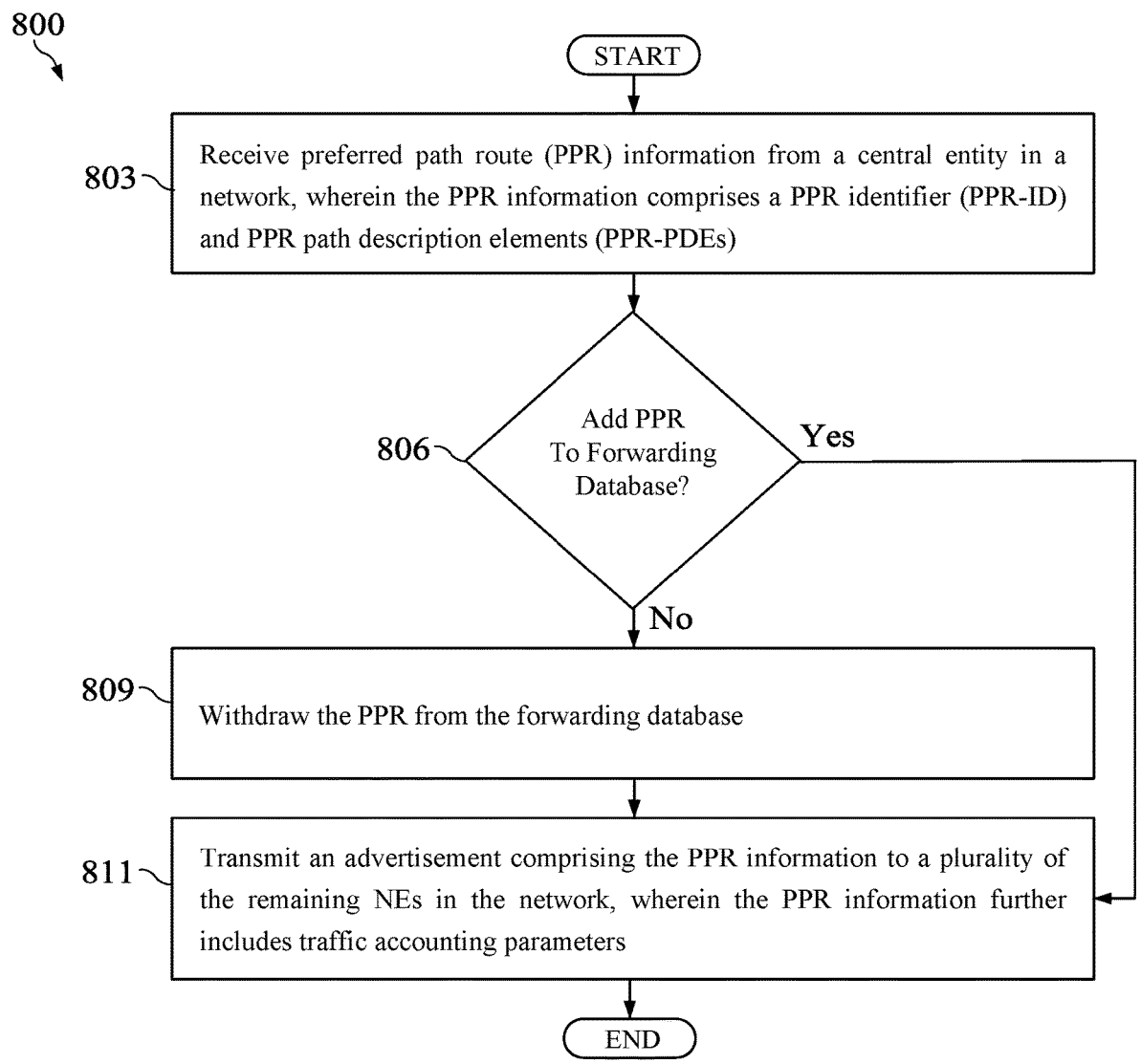
FIG. 8 is a method for implementing advertising and programming of a PPR in a network according to various embodiments of the disclosure.

FIG. 8 is a method 800 for implementing advertising and programming of a PPR 220A-B in a network, such as network 200, according various embodiments of the disclosure. In an embodiment, method 800 may be performed by an ingress NE 250 or any other NE 251-259 in the network 200. In an embodiment, method 800 may be performed after a central entity 103 obtains and transmits PPR information 303 to the ingress NE 250 of the network 200.

At step 803, the PPR information 303 may be received from a central entity 103 in a network 200 or locally provisioned by an operator of the network 200 or by a local configuration engine. For example, Rx 320 receives the PPR information 303 from the central entity 103. The PPR information 303 includes a PPR-ID 333 and a plurality of PPR-PDEs 366 describing one or more elements 201-219 and 250-261 (topological NEs 250-529, non-topological NEs 260-261, and/or links 201-219) on the PPR 220A-B determined between a source 270 and destination 280. For example, the PPR-PDEs 366 includes MPLS labels, IPv4 addresses, or IPv6 addresses of one or more of the elements 201-219 and 250-261 on the PPR 220A-B.

At step 806, a determination is made as to whether the PPR 220A-B should be added to the local forwarding database 343. For example, network configuration module 345 of processor 330 may be configured to determine whether the PPR 220A-B should be added to the local forwarding database 343. Such a determination may be based on whether the NE 250-259 receiving the PPR information 303 is identified in the PPR information 303. Such a determination may also be based on whether an attached non-topological NE 250-261 attached to the receiving NE 250-259 is identified in the PPR information 303.

When the NE 250-259 receiving the PPR information 303 is associated with a source 270 of the PPR 220A-B, then the PPR information 303 is added to the forwarding database 343. In addition, the central entity 103 may send an instruction with the PPR information 303 to add the PPR information 303 to the forwarding database 343.

At step 811, an advertisement comprising the PPR information 303 such as advertisements 400, 500, 600, and 700 is transmitted (or flooded in IGP terminology) to the remaining NEs 251-259 in the network 200 through IGP advertisements (OSPFv2/OSPFv3 LSAs or IS-IS LSP TLVs through entire IGP domain routers). In an embodiment, when the ingress NE 250 receives the PPR information 303 and determines that the PPR 220A-B is associated with the ingress NE 250, then the ingress NE 250 stores the PPR information 303 in association with the PPR-ID 333 and PPR-PDEs 366 at the forwarding database 343. The Tx 340 of ingress NE 250 may transmit the advertisement to all of the remaining NEs 251-259 in the network 2800.

When the NE 251-259 receiving the PPR information 303 is not associated with the source 270 of the PPR 220A-B or when the central entity 103 sends instructions to the NE 251-259 to withdraw the PPR 220A-B from the forwarding database 343, at step 809, the PPR 220A-B is withdrawn or deleted from the forwarding database 343. For example, the PPR information 303 in association with the PPR-ID 333 and PPR-PDEs 366 may be removed from the forwarding database 343.

Figure 9:
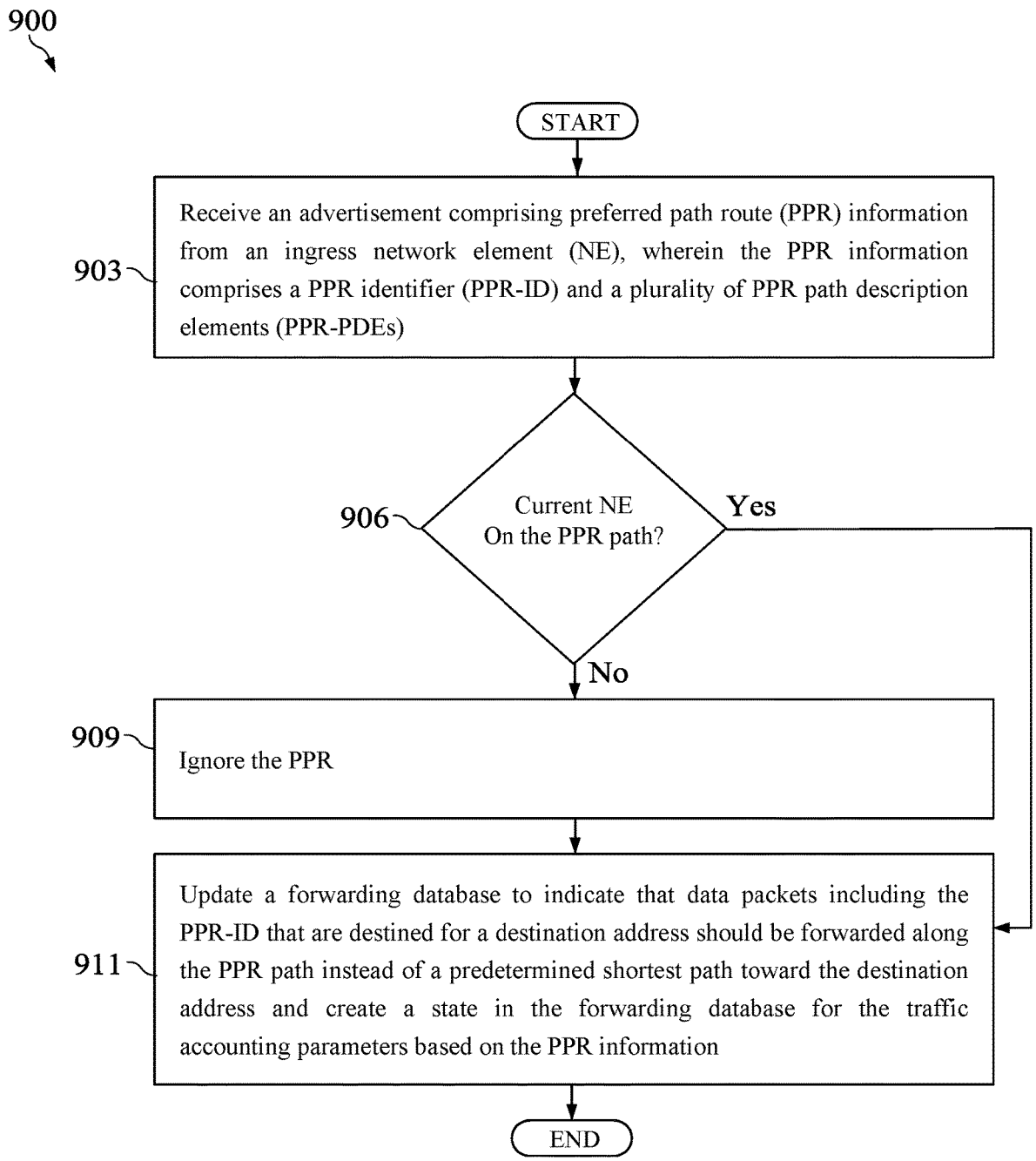
FIG. 9 is another method for implementing advertising a PPR in a control plane and programming of a PPR in a data plane according to various embodiments of the disclosure.

FIG. 9 is a method 900 for implementing advertising and programming of a PPR 220A-B in a network 200 according to various embodiments of the disclosure. In an embodiment, method 900 may be performed by a receiving NE 251-259 that receives the advertisement from an ingress NE 250. In an embodiment, method 900 may be performed after an ingress NE 250 transmits an advertisement to the remaining NEs 251-259.

At step 903, the advertisement comprising PPR information 303 describing a PPR 220A-B is received from an NE 250-259. For example, Rx 320 receives the advertisement from the ingress NE 250. The advertisement may be similar to advertisements 400, 500, 600, or 700. In an embodiment, the PPR information 303 comprises a PPR-ID 333 and a plurality of PPR-PDEs 366 describing one or more elements 201-219 and 250-261 (topological NEs 250-259, non-topological NEs 260-261, or links 201-219) on the PPR 220A-B determined between a source 270 and destination 280. For example, the PPR-PDEs 366 includes MPLS labels, IPv4 addresses, or IPv6 addresses of each of the elements 201-219 and 250-261 on the PPR 220A-B.

At step 906, a determination is made as to whether the current NE 251-261 is on the PPR 220A-B. For example, suppose the current node is NE 257, the network configuration module 335 of the processor 330 executing at NE 257 may determine that NE 257 is not on the first PPR 220A identified by PPR-ID=2, but that NE 257 is on the second PPR 220B identified by PPR-ID=3.

At step 909, the PPR information 303 identified by PPR-ID=2 is ignored, and at step 911, the forwarding database 343 is updated to include the PPR information 303 identified by PPR-ID=3. In an embodiment, the forwarding database 343 is updated to indicate that data packets 450 including the PPR-ID=3 and/or the prefix or destination address 445 should be forwarded along the PPR 220B instead of the shortest path 221.

In an embodiment, at step 911, a state is created in the forwarding database 343 for the requested traffic accounting parameters. For example, the network configuration module 345 of the processor 330 is configured to update the forwarding database 343 to indicate that data packets 450 including the PPR-ID=3 that are destined for a prefix or destination address 445 should be forwarded along the PPR 220B instead of a predetermined shortest path 221 toward the prefix or destination address 445. In the example, NE 257 updates the local forwarding database 343 to indicate that data packets 450 including a prefix or destination address 445 associated with NE 255 should be redirected to NE 258, which is the next element on the PPR 220B identified by PPR-ID=3, instead of NE 259, which is the next element on the shortest path 221. In this step, when a topological NE 250-259 receives PPR information 303 regarding non-topological NEs 260-261 that are hosted by or somehow associated with a respective topological NE 25-259, the topological NE 250-259 updates the forwarding database 343 to indicate that the one or more services, functions, or contexts associated with the associated topological NE 25-259 may be performed before forwarding to a next topological NE 250-259 on a PPR 220A-B.

Figure 10:
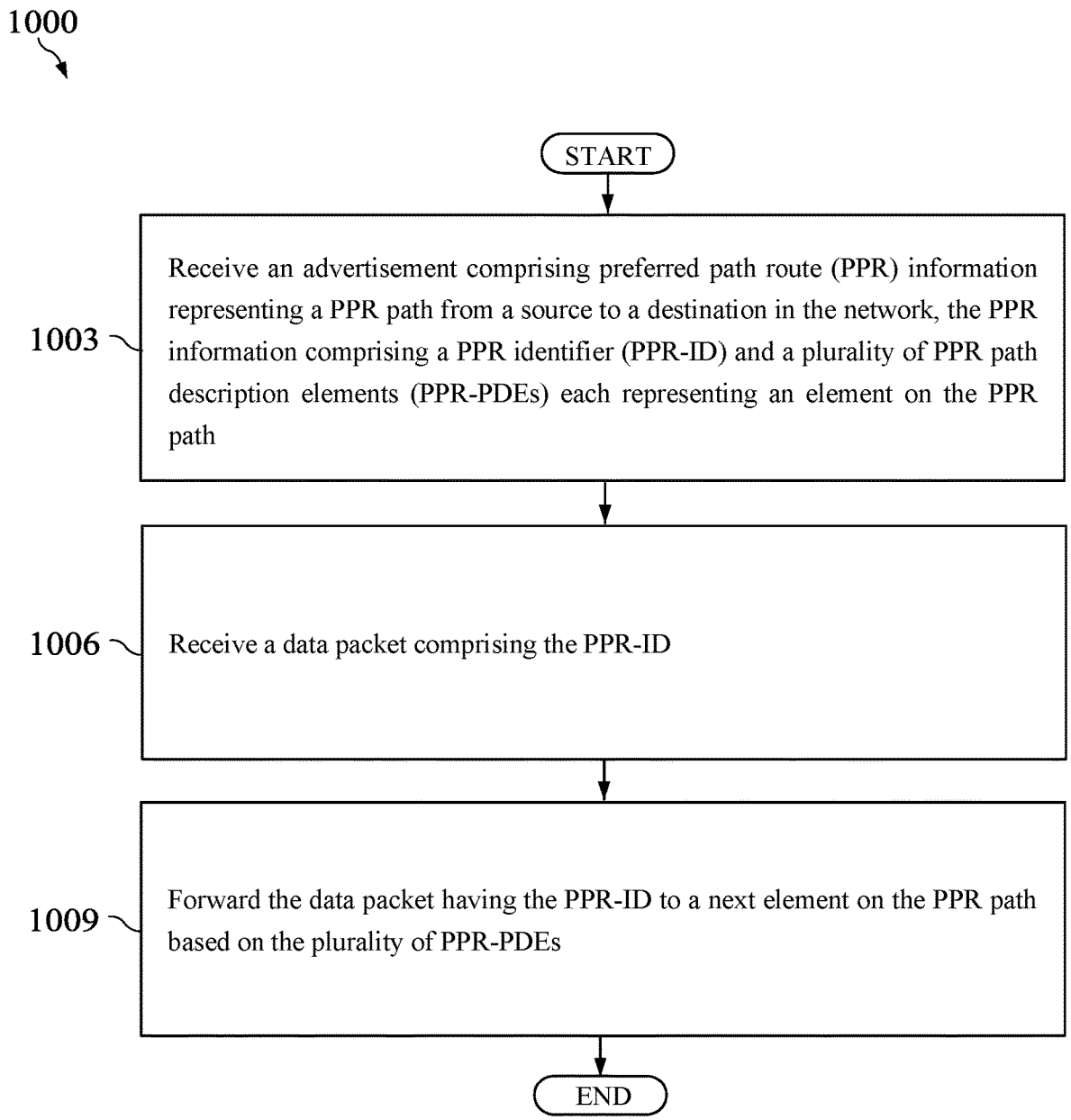
FIG. 10 is yet another method for implementing advertising and programming of a PPR in a network according to various embodiments of the disclosure.

FIG. 10 is a method 1000 for implementing advertising the PPR information 303 in the control plane and programming of a PPR in the data plane, according various embodiments of the disclosure. In an embodiment, method 1000 may be performed by an ingress NE 250 or any other NE 251-259 in the network 200. In an embodiment, method 1000 may be performed after a central entity 103 obtains and transmits PPR information 303 to the ingress NE 250 of the network 200.

At step 1003, PPR information 303 representing a PPR 220A-B from a source 270 to a destination 280 in the network 200 is received by an NE 250-259 in the network 200. The advertisement may be similar to advertisements 400, 500, 600, or 700. For example, Rx 320 receives the PPR information 303 from the central entity 103 or an ingress NE 250. The PPR information 303 includes a PPR-ID 333 and a plurality of PPR-PDEs 366 each representing an element 201-219 and/or 250-261 on the PPR 220A-B.

At step 1006, a data packet 450 comprising the PPR-ID 333 is received by an NE 250-259 in the network. For example, the Rx 320 receives the data packet 450 comprising the PPR-ID 333.

At step 1009, the data packet 450 having the PPR-ID 333 is forwarded to a next element 201-219 and/or NE 250-261 on the PPR 220A-B based on the PPR-PDEs 366. In an embodiment, Tx 340 forwards the data packet 450 to a next element 201-219 and/or NE 250-261 on the PPR 220A-B based on the PPR-PDEs 366.

Figure 11:
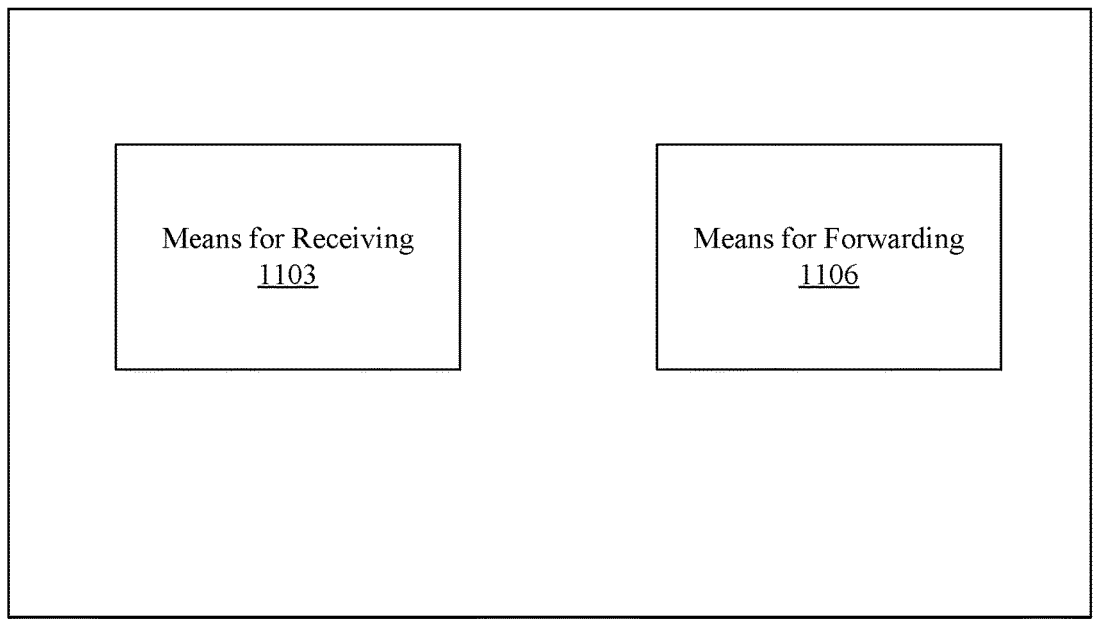
FIG. 11 shows an apparatus for advertising and programming of a PPR in a network according to various embodiments of the disclosure.

FIG. 11 shows an apparatus 1100 for advertising and programming of a PPR 220A-B in a network 200 according to various embodiments of the disclosure. The apparatus 1100 comprises a means for receiving 1103 and a means for forwarding 1106. The means for receiving 1103 comprises a means to receive an advertisement comprising PPR information 303 representing a PPR 220A-B from a source 270 to a destination 280 in the network 200. The advertisement may be similar to advertisements 400, 500, 600, or 700. PPR information 303 includes a PPR-ID 333 and a plurality of PPR-PDEs 366 each representing an element 201-219 and 250-261 on the PPR 220A-B. The means for receiving 1103 further comprises a means for receiving a data packet 450 comprising the PPR-ID 333. The means for forwarding 1106 comprises a means for forwarding the data packet 450 to a next element 201-219 and/or NE 250-261 on the PPR 220A-B based on the PPR-PDEs 366.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A method implemented by a network element (NE) in a network, comprising:
   receiving an advertisement comprising preferred path route (PPR) information representing a PPR from a source to a destination in the network,
      the PPR being a path including a plurality of elements between the source and the destination in the network,
      the PPR information comprising a PPR identifier (PPR-ID) identifying the PPR, a plurality of PPR description elements (PPR-PDEs), and a PPR-PDE type field,
      each of the PPR-PDEs being an information element including an identifier representing an element of the plurality of elements on the PPR, and
      the PPR-PDE type field including a value representing a type of the element being identified in a respective PPR-PDE, the type of element being either a topological element or a non-topological element;
   when the NE is identified in one of the PPR-PDEs included in the advertisement:
      determining a next PPR-PDE of the PPR-PDEs, the next PPR-PDE corresponding to a next element along the PPR identified by the PPR-ID to the destination; and
      updating a forwarding database to include an entry for the PPR information carried in the advertisement, the entry indicating the PPR-ID and the next element along the PPR;
   receiving, by the NE, a data packet comprising the PPR-ID; and
   forwarding, by the NE, the data packet having the PPR-ID to the next element on the PPR.

2. The method of claim 1, wherein the PPR-ID is at least one of a Multi-Protocol Label Switching (MPLS) label, a segment identifier (SID), an Internet Protocol (IP) version 4 (IPv4) address, or an IP version 6 (IPv6) address.

3. The method of claim 1, wherein the PPR deviates from a predetermined shortest path between the source and the destination based on a network characteristic requested by a client.

4. The method of claim 1, further comprising receiving, by the receiver, traffic engineering (TE) source routed path information relating to a plurality of sources attached to the NE, wherein the TE source routed path information comprises the PPR information for the source of the plurality of sources.

5. The method of claim 1, wherein the topological element comprises at least one of a network element or a link, and wherein the non-topological element comprises at least one of a service, function, or context.

6. The method of claim 1, wherein the advertisement comprises a flag set to indicate that the PPR-ID identifies a strict-PPR between the source and the destination, wherein the PPR-PDEs describes all topological NEs on the PPR.

7. The method of claim 1, wherein the advertisement comprises a flag set to indicate that the PPR-ID identifies a loose-PPR between the source and the destination, wherein the PPR-PDEs describes a subset of topological NEs on the PPR.

8. The method of claim 7, wherein the network implements Multi-Protocol Label Switching (MPLS), wherein the data packet comprises a bottom label and a top label, wherein the bottom label comprises the PPR-ID, and wherein the top label comprises a label identifying the next element on the PPR.

9. A network element (NE) implemented in a network, comprising:
a memory configured to store instructions; and
a processor coupled to the memory and configured to execute the instructions, which cause the processor to be configured to:
receive an advertisement comprising preferred path route (PPR) information representing a PPR from a source to a destination in the network,
the PPR being a path including a plurality of elements between the source and the destination in the network,
the PPR information comprising a PPR identifier (PPR-ID) identifying the PPR, a plurality of PPR description elements (PPR-PDEs), and a PPR-PDE type field,
each of the PPR-PDEs being an information element including an identifier representing an element of the plurality of elements on the PPR, and
the PPR-PDE type field including a value representing a type of the element being identified in a respective PPR-PDE, the type of element being either a topological element or a non-topological element;
when the NE is identified in one of the PPR-PDEs included in the advertisement:
determine a next PPR-PDE of the PPR-PDEs, the next PPR-PDE corresponding to a next element along the PPR identified by the PPR-ID to the destination; and
update a forwarding database to include an entry for the PPR information carried in the advertisement, the entry indicating the PPR-ID and the next element along the PPR;
receive a data packet comprising the PPR-ID; and
to forward the data packet having the PPR-ID to the next element on the PPR.

10. The NE of claim 9, wherein the PPR-PDEs are carried in the advertisement according to an order of the elements on the PPR.

11. The NE of claim 9, wherein each of the PPR-PDEs comprises an address of a respective element on the PPR and a path description element (PDE) identifier (PDE-ID) that defines a type of the address.

12. The NE of claim 9, wherein the advertisement comprises a flag instructing the NE to maintain a count of a number of data packets comprising the PPR-ID transmitted along the PPR.

13. The NE of claim 9, wherein the PPR information is received from a central entity of the network.

14. A non-transitory medium configured to store a computer program product comprising computer executable instructions that when executed by a processor of a network element (NE) cause the processor to:
receive an advertisement comprising preferred path route (PPR) information representing a PPR from a source to a destination in a network,
the PPR being a path including a plurality of elements between the source and the destination in the network,
the PPR information comprising a PPR identifier (PPR-ID) identifying the PPR, a plurality of PPR description elements (PPR-PDEs), and a PPR-PDE type field,
each of the PPR-PDEs being an information element including an identifier representing an element of the plurality of elements on the PPR, and
the PPR-PDE type field including a value representing a type of the element being identified in a respective PPR-PDE, the type of element being either a topological element or a non-topological element;
when the NE is identified in one of the PPR-PDEs included in the advertisement:
determine a next PPR-PDE of the PPR-PDEs, the next PPR-PDE corresponding to a next element along the PPR identified by the PPR-ID to the destination; and
update a forwarding database to include an entry for the PPR information carried in the advertisement, the entry indicating the PPR-ID and the next element along the PPR;
receive a data packet comprising the PPR-ID; and
forward the data packet having the PPR-ID to the next element on the PPR.

15. The non-transitory medium of claim 14, wherein each of the PPR-PDEs comprises an address of a respective element on the PPR.

16. The non-transitory medium of claim 14, wherein the topological element comprises at least one of a network element or a link, and wherein the non-topological element comprises at least one of a service, function, or context.

17. The non-transitory medium of claim 14, wherein the PPR-ID is at least one of a Multi-Protocol Label Switching (MPLS) label, a segment identifier (SID), an Internet Protocol (IP) version 4 (IPv4) address, or an IP version 6 (IPv6) address.

18. The method of claim 1, wherein at least one of the PPR-PDEs represents a physical NE.

19. The method of claim 1, wherein the advertisement comprises a flag signaling the NE to maintain a counter indicating a quantity of times the NE forwards different data packets along the PPR.

20. The NE of claim 9, wherein the advertisement comprises a flag signaling the NE to maintain a counter indicating a quantity of times the NE forwards different data packets along the PPR.

21. The non-transitory medium of claim 14, wherein the advertisement comprises a flag signaling the NE to maintain a counter indicating a quantity of times the NE forwards different data packets along the PPR.

* * * * *

UNITED STATES PATENT AND TRADEMARK OFFICE
CERTIFICATE OF CORRECTION

PATENT NO. : 11,770,329 B2
APPLICATION NO. : 16/997427
DATED : September 26, 2023
INVENTOR(S) : Uma S. Chunduri et al.

Page 1 of 1

It is certified that error appears in the above-identified patent and that said Letters Patent is hereby corrected as shown below:

In the Claims

Column 31, Claim 9, Lines 31-67, should read:
9. A network element (NE) implemented in a network, comprising:
 a memory configured to store instructions; and
 a processor coupled to the memory and configured to execute the instructions, which cause the processor to be configured to:
  receive an advertisement comprising preferred path route (PPR) information representing a PPR from a source to a destination in the network,
the PPR being a path including a plurality of elements between the source and the destination in the network,
the PPR information comprising a PPR identifier (PPR-ID) identifying the PPR, a plurality of PPR description elements (PPR-PDEs), and a PPR-PDE type field,
each of the PPR-PDEs being an information element including an identifier representing an element of the plurality of elements on the PPR, and
the PPR-PDE type field including a value representing a type of the element being identified in a respective PPR-PDE, the type of element being either a topological element or a non-topological element;
  when the NE is identified in one of the PPR-PDEs included in the advertisement:
   determine a next PPR-PDE of the PPR-PDEs, the next PPR-PDE corresponding to a next element along the PPR identified by the PPR-ID to the destination; and
   update a forwarding database to include an entry for the PPR information carried in the advertisement, the entry indicating the PPR-ID and the next element along the PPR;
  receive a data packet comprising the PPR-ID; and
  forward the data packet having the PPR-ID to the next element on the PPR.

Signed and Sealed this
Twenty-first Day of November, 2023

Katherine Kelly Vidal
*Director of the United States Patent and Trademark Office*